United States Patent
Won

(10) Patent No.: US 11,550,466 B2
(45) Date of Patent: Jan. 10, 2023

(54) METHOD OF CONTROLLING A LIST SCROLL BAR AND AN ELECTRONIC DEVICE USING THE SAME

(71) Applicant: Samsung Electronics Co., Ltd., Gyeonggi-do (KR)

(72) Inventor: Sung-Joon Won, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 71 days.

(21) Appl. No.: 16/103,109

(22) Filed: Aug. 14, 2018

(65) Prior Publication Data
US 2018/0356971 A1    Dec. 13, 2018

Related U.S. Application Data

(63) Continuation of application No. 13/973,399, filed on Aug. 22, 2013, now abandoned.

(30) Foreign Application Priority Data

Aug. 27, 2012    (KR) .......... 10-2012-0093915

(51) Int. Cl.
*G06F 3/04855* (2022.01)
*G06F 3/0488* (2022.01)
(Continued)

(52) U.S. Cl.
CPC ........ *G06F 3/04855* (2013.01); *G06F 3/0485* (2013.01); *G06F 3/0488* (2013.01); *G06F 3/04842* (2013.01)

(58) Field of Classification Search
CPC .... G06F 3/0485; G06F 3/0482; G06F 3/0488; G06F 3/0483; G06F 3/04847;
(Continued)

(56) References Cited

U.S. PATENT DOCUMENTS 5,550,559 A    8/1996  Isensee et al.
6,147,683 A *  11/2000 Martinez ............ G06F 3/04855
                                                 715/786
(Continued)

FOREIGN PATENT DOCUMENTS

CN    101446884 A    6/2009
CN    102263856 A    11/2011
(Continued)

OTHER PUBLICATIONS

DiGiacomo, Patricia. Special Edition Using Microsoft Office Outlook 2007. Que Publishing, 2006. p. 213 and p. 491.
Chinese Search Report dated Aug. 26, 2021.

*Primary Examiner* — Adam M Queler
*Assistant Examiner* — Maria S Ayad
(74) *Attorney, Agent, or Firm* — Cha & Reiter, LLC

(57) ABSTRACT

A method controls a list scroll bar, including displaying a partial area of a list having at least one first item, and a list scroll bar to scroll the list; expanding and displaying a first index area having at least one first index corresponding to the at least one first item in the list scroll bar; downscaling a second index area having at least one second index corresponding to at least one second item different from the at least one first item and displaying a representative second index representing the second index area in the list scroll bar; and upon detecting a gesture to select the representative second index, expanding and displaying the second index area in the list scroll bar while downscaling the first index area and displaying a representative first index representing the first index area in the list scroll bar.

11 Claims, 17 Drawing Sheets

(51) Int. Cl.
  *G06F 3/0485* (2022.01)
  *G06F 3/04842* (2022.01)

(58) Field of Classification Search
  CPC ............. G06F 3/04855; G06F 3/04886; G06F 3/04817; G06F 17/3087; G06F 17/212; G06F 3/0481; G06F 9/4443; G06F 17/30896; G06F 17/241; G06F 17/30873; G06F 17/30716; G09G 5/00; G06Q 10/10; G06Q 10/00; G06Q 10/101; G06Q 10/103
  See application file for complete search history.

(56) References Cited

U.S. PATENT DOCUMENTS

| | | | | |
|---|---|---|---|---|
| 6,252,597 | B1* | 6/2001 | Lokuge | G06F 3/0481 715/841 |
| 6,448,985 | B1* | 9/2002 | McNally | G06F 3/0481 715/784 |
| 6,816,174 | B2* | 11/2004 | Tiongson | G06F 3/04855 715/784 |
| 7,676,759 | B2 | 3/2010 | Carter | |
| 8,108,430 | B2* | 1/2012 | Wong | G06F 16/26 707/792 |
| 8,302,024 | B2* | 10/2012 | Smith | G06F 3/04855 715/764 |
| 8,464,176 | B2 | 6/2013 | Van Dok et al. | |
| 8,683,385 | B2* | 3/2014 | Park | G06F 3/0482 715/784 |
| 9,779,181 | B2* | 10/2017 | De Peuter | G06F 3/0482 |
| 2002/0109728 | A1 | 8/2002 | Tiongson | G06F 3/04855 715/786 |
| 2003/0189553 | A1* | 10/2003 | Goren | G06F 3/04886 345/173 |
| 2004/0036680 | A1 | 2/2004 | Davis et al. | |
| 2006/0036942 | A1* | 2/2006 | Carter | G06F 3/0485 715/273 |
| 2006/0184901 | A1 | 8/2006 | Dietz | |
| 2007/0143705 | A1 | 6/2007 | Peters | |
| 2007/0277110 | A1* | 11/2007 | Rogers | H04L 41/22 715/736 |
| 2009/0073194 | A1* | 3/2009 | Ording | H04M 1/72522 345/672 |
| 2010/0011315 | A1* | 1/2010 | Araki | G06F 3/0485 715/783 |
| 2010/0138357 | A1* | 6/2010 | Mufti-Bey | G06Q 40/04 705/36 R |
| 2010/0156815 | A1* | 6/2010 | Silberman | G06F 3/0236 345/173 |
| 2010/0287154 | A1* | 11/2010 | Tee | G06F 3/04855 707/708 |
| 2010/0298034 | A1 | 11/2010 | Shin et al. | |
| 2010/0306648 | A1* | 12/2010 | Wilairat | G06F 3/0488 715/702 |
| 2011/0157046 | A1* | 6/2011 | Lee | G06F 1/1643 345/173 |
| 2012/0011466 | A1 | 1/2012 | Miyamoto et al. | |
| 2012/0023438 | A1* | 1/2012 | Xia | G06F 3/0482 715/783 |
| 2012/0042279 | A1 | 2/2012 | Naderi | |
| 2012/0054670 | A1 | 3/2012 | Rainisto | |
| 2012/0124469 | A1* | 5/2012 | Nakajima | G06F 3/04817 715/702 |
| 2013/0035143 | A1* | 2/2013 | Izutsu | A63F 13/2145 455/566 |
| 2013/0132892 | A1 | 5/2013 | Lentz et al. | |
| 2014/0149878 | A1* | 5/2014 | Mischari | G06F 3/0482 715/739 |
| 2015/0199123 | A1* | 7/2015 | Jitkoff | G06F 3/0484 715/786 |
| 2015/0378545 | A1* | 12/2015 | Telang | G06F 3/0485 715/822 |

FOREIGN PATENT DOCUMENTS

| | | |
|---|---|---|
| CN | 102428429 A | 4/2012 |
| CN | 102528429 A | 7/2012 |
| CN | 103403659 A | 11/2013 |

* cited by examiner

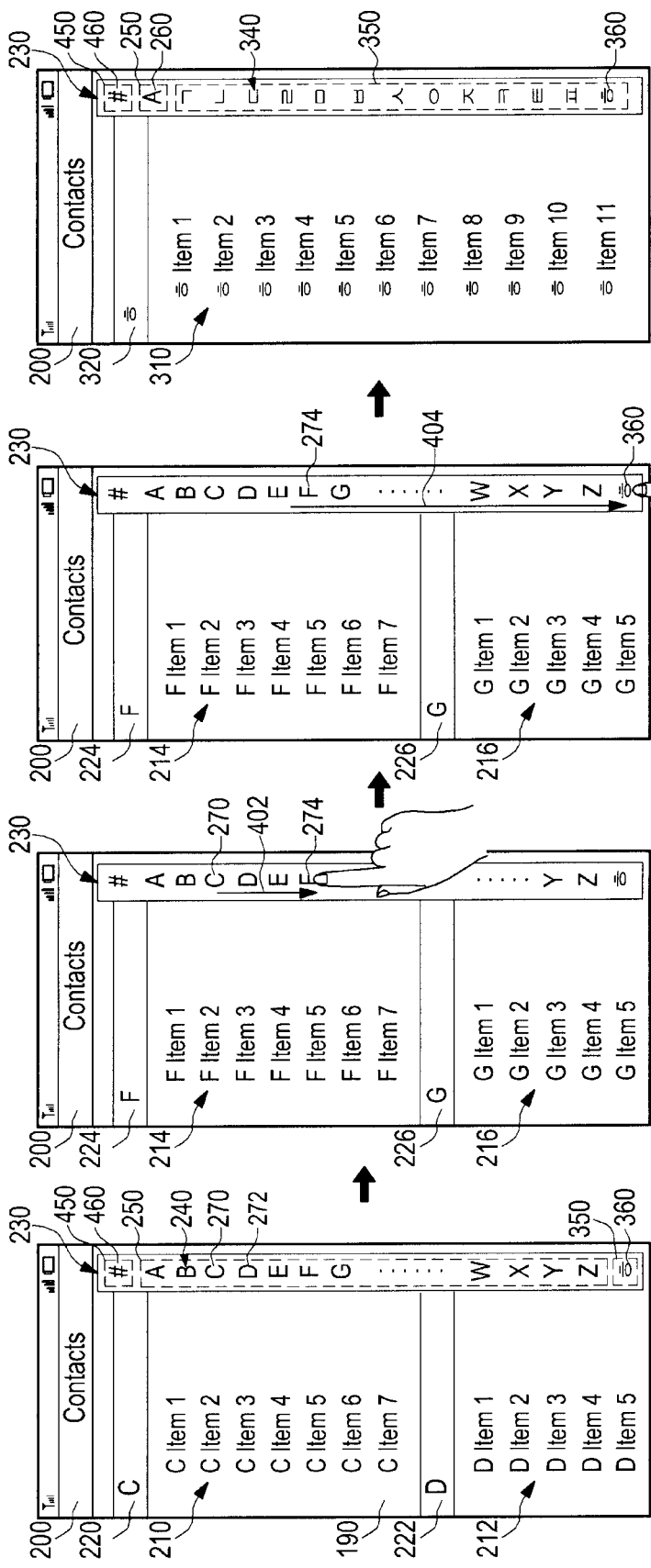

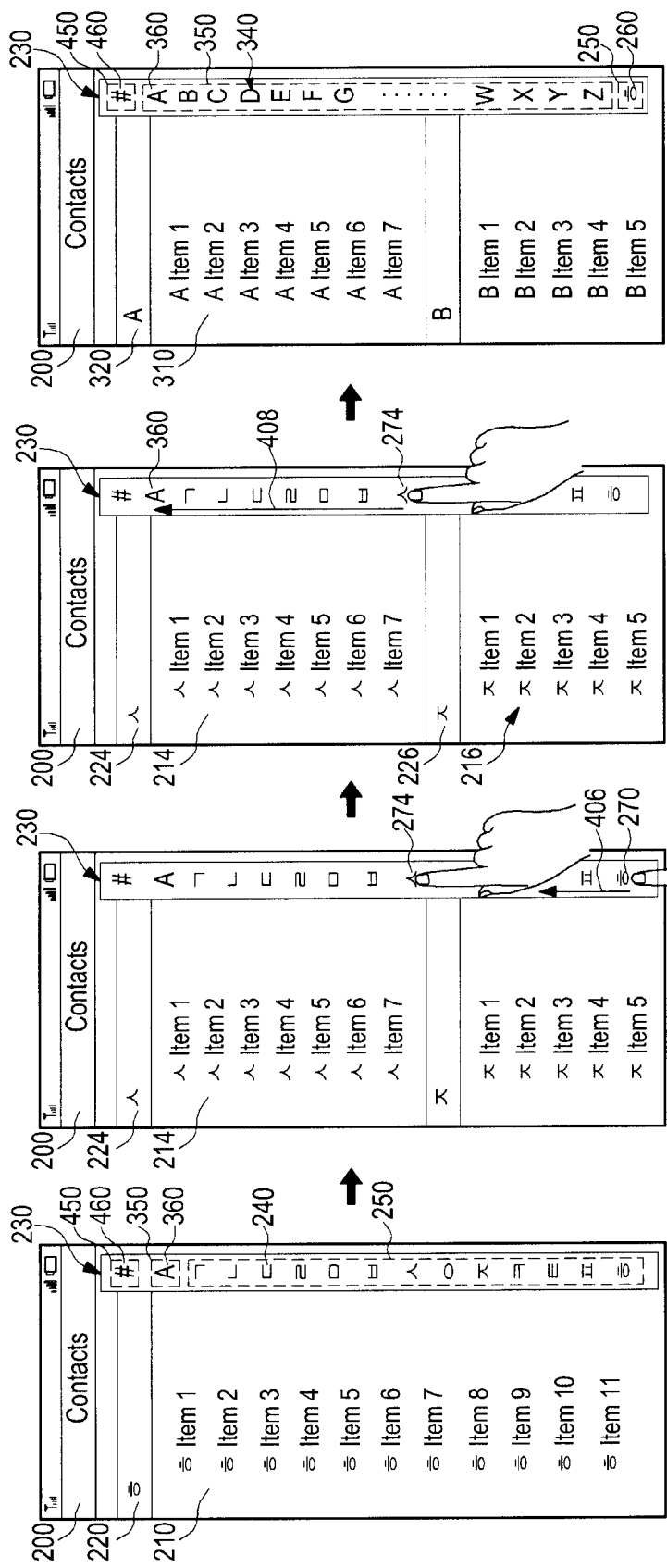

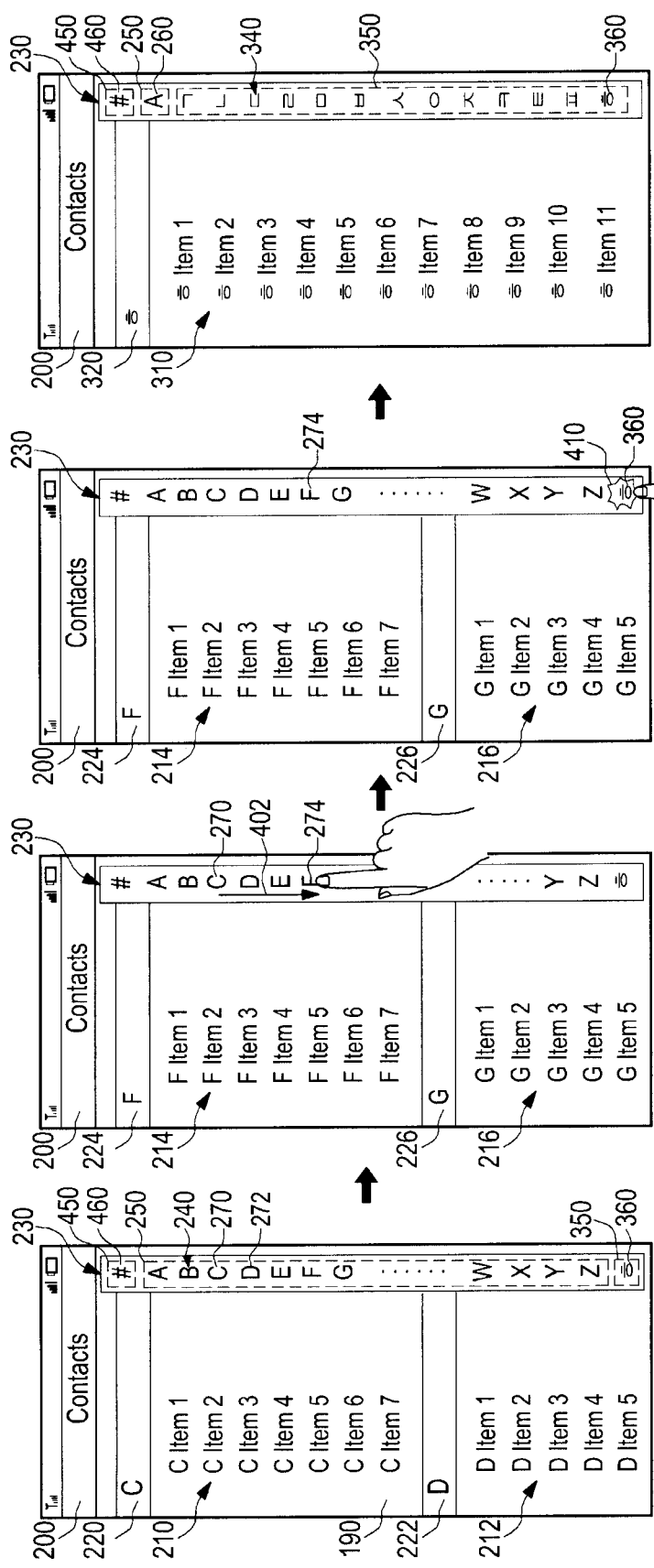

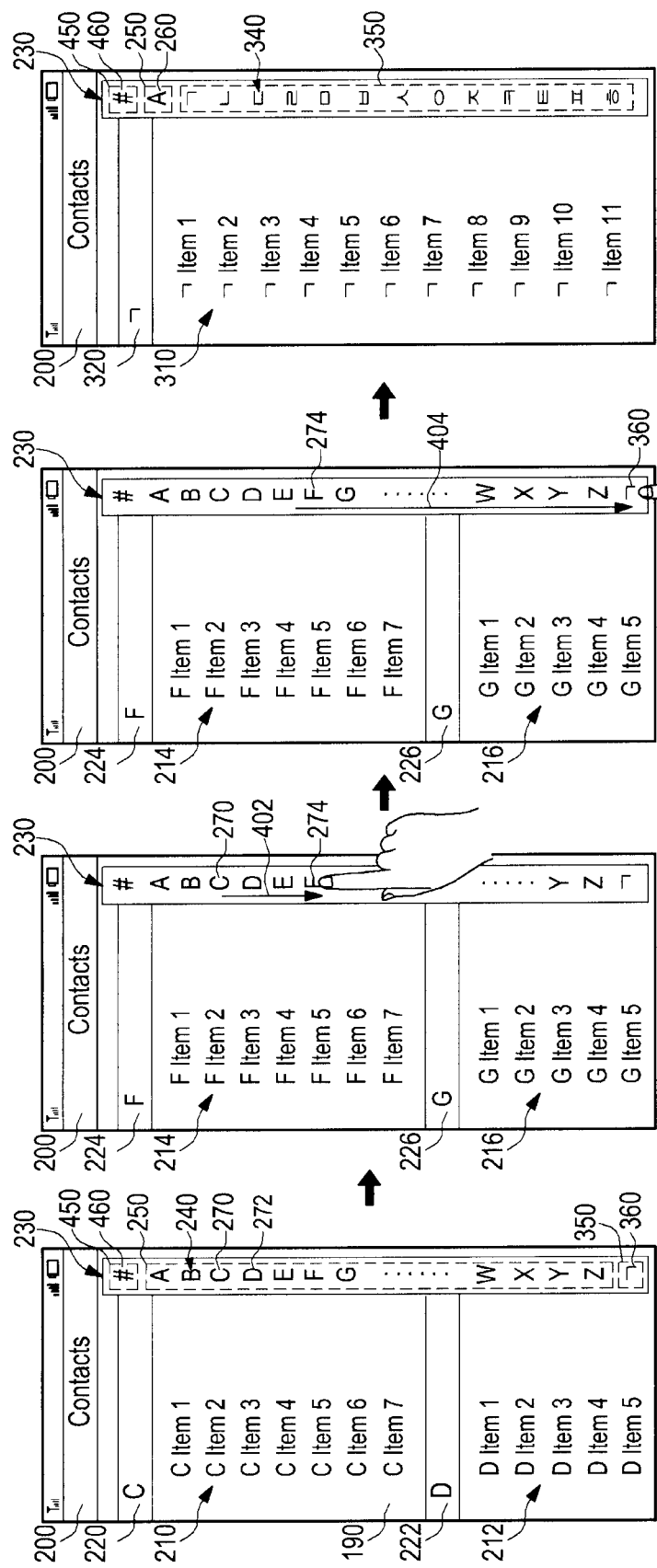

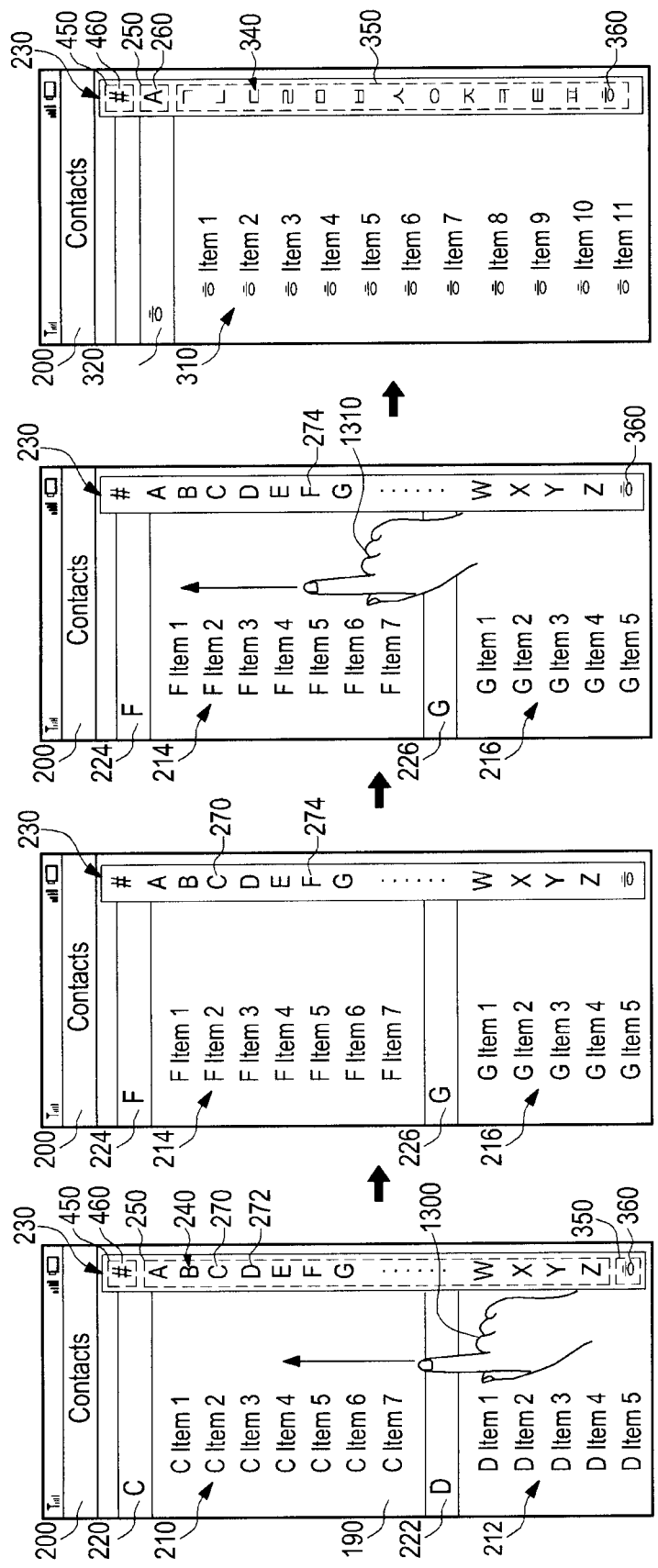

METHOD OF CONTROLLING A LIST SCROLL BAR AND AN ELECTRONIC DEVICE USING THE SAME

CROSS REFERENCE TO RELATED APPLICATIONS

This application is a Continuation of U.S. patent application Ser. No. 13/973,399 filed on Aug. 22, 2013 which claims, pursuant to 35 U.S.C. § 119(a), priority to and the benefit of the earlier filing date of a Korean Patent Application filed in the Korean Intellectual Property Office on Aug. 27, 2012, and assigned Serial No. 10-2012-0093915, the entire disclosure of which is incorporated herein by reference.

BACKGROUND

1. Field of the Invention

The present disclosure relates generally to an electronic device, and more particularly, to a control method of scrolling a list displayed on a screen of the electronic device.

2. Description of the Related Art

In the prior art, mobile devices can run many different applications. The applications may include various kinds of lists. The list includes at least one item. For example, a music application can play music in the mobile device. Here, the music application includes a music list including at least a piece of music that corresponds to the at least one item.

In addition, in the prior art, the mobile device provides a method of scrolling the list. In particular, a mobile device established with a touchscreen can scroll the list by detecting dragging or scrolling across the touchscreen displaying the list.

The mobile device can also display at least one index on the screen such that the list may be easily scrolled. The mobile device can provide a method of quickly scrolling the list to an item that corresponds to a selected index by detecting the selection of the index.

Meanwhile, the list may include the at least one item formed of a plurality of characters, numbers, or symbols. It is difficult to generate at least one index or to receive a choice of the at least one index, because the at least one index corresponding to the plurality of characters, numbers, or symbols are numerous. Thus, there is a need for a method of the mobile device for easily displaying at least one index that corresponds to at least one item formed of the foregoing plurality of characters, numbers, or symbols on the screen of the mobile device, and detecting the choice of the at least one index.

SUMMARY

The present invention provides a control method of scrolling a list displayed on a screen of an electronic device.

The present invention also provides a method of scrolling a list displayed on a screen using a list scroll bar.

The present invention further provides a method of controlling the list scroll bar that includes indexes corresponding to a plurality of characters, numbers, or symbols.

In accordance with an aspect of the present invention, a method is provided for controlling a list scroll bar, with the method including: displaying a partial area of a list that includes at least one first item formed of at least one of characters, numbers, and symbols, and a list scroll bar to scroll the list; expanding and displaying a first index area that includes at least one first index corresponding to the at least one first item in the list scroll bar; downscaling a second index area that includes at least one second index corresponding to at least one second item different from the at least one first item and displaying a representative second index that represents the second index area in the list scroll bar; and upon detecting a gesture to select the representative second index, expanding and displaying the second index area in the list scroll bar while downscaling the first index area and displaying a representative first index that represents the first index area in the first list scroll bar.

In accordance with another aspect of the present invention, an electronic device is provided having a list scroll bar, with the electronic device including: a display unit for displaying a screen; a controller for displaying a partial area of a list that includes at least one first item formed of at least one of characters, numbers, and symbols, and a first list scroll bar to scroll the list; expanding and displaying a first index area that includes at least one first index corresponding to the at least one first item in the first list scroll bar; downscaling a second index area that includes at least one second index corresponding to at least one second item different from the at least one first item and displaying a representative second index that represents the second index area in the first list scroll bar; and upon detecting a gesture to select the representative second index, expanding and displaying the second index area in the first list scroll bar while downscaling the first index area and displaying a representative first index that represents the first index area in the first list scroll bar; and a storage for storing the at least one first item and the at least one second item.

BRIEF DESCRIPTION OF THE DRAWINGS

The above and other features and advantages of the present invention will become more apparent by describing in detail exemplary embodiments thereof with reference to the attached drawings in which:

FIG. 5A, FIG. 5B, FIG. 5C and FIG. 5D illustrate diagrams representing a method of controlling a list scroll bar, according to the exemplary embodiment of the present invention;

FIG. 6A, FIG. 6B, FIG. 6C and FIG. 6D illustrate diagrams representing a second example, according to the exemplary embodiment of the present invention;

FIG. 7A, FIG. 7B, FIG. 7C and FIG. 7D illustrate diagrams representing a third example, according to the exemplary embodiment of the present invention;

FIG. 8A, FIG. 8B, FIG. 8C and FIG. 8D illustrate diagrams representing a fourth example, according to the exemplary embodiment of the present invention;

FIG. 13A, FIG. 13B, FIG. 13C and FIG. 13D illustrate diagrams representing a method of controlling a list scroll bar, according to the alternative exemplary embodiment of the present invention;

DETAILED DESCRIPTION

Figure 1:
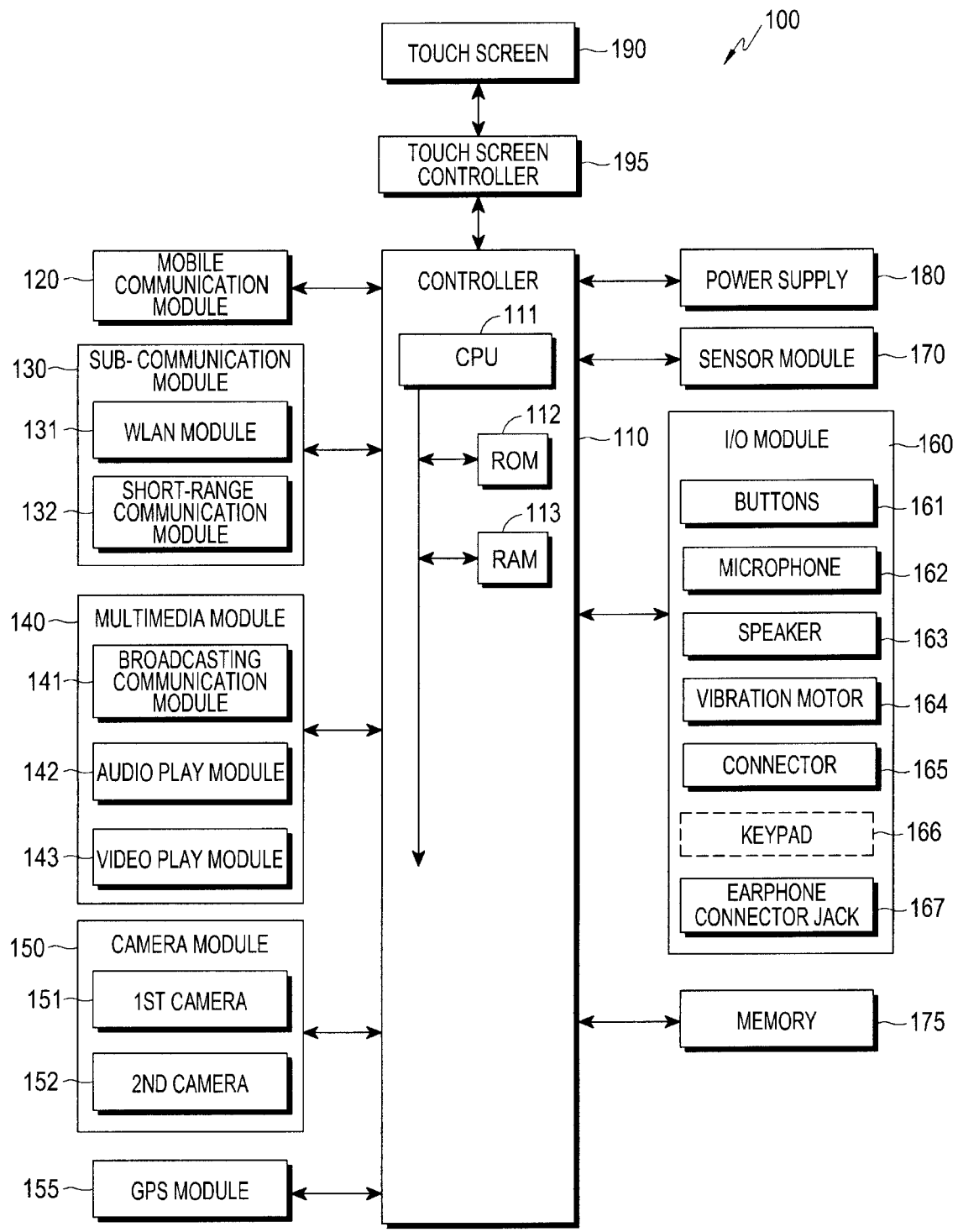
FIG. 1 is a schematic block diagram of an electronic device, according to an exemplary embodiment of the present invention.

The invention now will be described more fully hereinafter with reference to the accompanying drawings, in which illustrative exemplary embodiments of the invention are shown. This invention may, however, be embodied in many different forms and should not be construed as limited to the exemplary embodiments set forth herein; rather, these exemplary embodiments are provided so that this disclosure will be thorough and complete, and will fully convey the scope of the invention to those skilled in the art. Like numbers refer to like elements throughout.

In the following description, a detailed explanation of known related functions and constructions may be omitted to avoid unnecessarily obscuring the subject matter of the present invention. In addition, terms described herein, which are defined with reference to the functions of the present invention, may be implemented differently depending on a user or operator's intention and practice. Therefore, the terms should be understood on the basis of the disclosure throughout the specification. The principles and features of this invention may be employed in varied and numerous exemplary embodiments without departing from the scope of the invention.

Furthermore, although the drawings represent exemplary embodiments of the invention, the drawings are not necessarily to scale and certain features may be exaggerated or omitted in order to more clearly illustrate and explain the present invention.

Among the terms set forth herein, a terminal, mobile device, portable device, or electronic device refers to any kind of device capable of processing data which is transmitted or received to or from any external entity. The terminal, mobile device, portable device, or electronic device may display icons or menus on a screen to which stored data and various executable functions are assigned or mapped. The terminal, mobile device, portable device, or electronic device may include a computer, a notebook, a tablet PC, a cellphone, and the like.

Among the terms set forth herein, a screen refers to a display or other output devices which visually display information to the user, and which optionally are capable of receiving and electronically processing tactile inputs from a user using a stylo, a finger of the user, or other techniques for conveying a user selection from the user to the output devices.

Among the terms set forth herein, an icon refers to a graphical element such as a figure or a symbol displayed on the screen of the device such that a user can easily select a desired function or data. In particular, each icon has a mapping relation with any function being executable in the device or with any data stored in the device and is used for processing functions or selecting data in the device. When a user selects one of the displayed icons, the device identifies a particular function or data associated with the selected icon. Then the device executes the identified function or displays the identified data.

Among the terms set forth herein, data refers to any kind of information processed by the device, including text and/or images received from any external entities, messages transmitted or received, and information created when a specific function is executed by the device.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention. Descriptions shall be understood as to include any and all combinations of one or more of the associated listed items when the items are described by using the conjunctive term "and/or" or the like.

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, numbers, steps, operations, elements, and/or components, but do not preclude the presence or addition of one or more other features, numbers, steps, operations, elements, components, and/or groups thereof.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a schematic block diagram of an electronic device, according to an exemplary embodiment of the present invention.

Referring to FIG. 1, the electronic device 100 may be connected to an external device by using an external device connection, such as a sub-communication module 130, a connector 165, and an earphone connector jack 167. The "external device" may include a variety of devices, such as earphones, external speakers, universal serial bus (USB) memories, chargers, cradles/docks, DMB antennas, mobile payment related devices, health care devices (e.g., blood sugar testers), game consoles, vehicle navigation systems, or the like, which may be removable from the electronic device 100 and connected thereto via cable. The "external device" may also include a short range communication device that may be wirelessly connected to the electronic device 100 via short range communication, such as BLUETOOTH™, a short range wireless communications technology at the 2.4 GHz band, commercially available from the BLUETOOTH SPECIAL INTEREST GROUP, INC., Near Field Communication (NFC), etc., and a wireless communication device using WI-FI DIRECT, a wireless technology for data exchange over a computer network, commercially available from the WI-FI ALLIANCE, a wireless access point (AP), etc. Furthermore, the external device may include any other device, such as a cell phone, a smartphone, a tablet PC, a desktop PC, and a server.

Referring to FIG. 1, the electronic device 100 includes a display unit which may be a touchscreen 190 and a display controller which may be a touchscreen controller 195. The electronic device 100 also includes a controller 110, the mobile communication module 120, the sub-communication module 130, a multimedia module 140, a camera module 150, a Global Positioning System (GPS) module 155, an input/output (I/O) module 160, a sensor module 170, a storage or memory 175, and a power supply 180. The sub-communication module 130 includes at least one of a wireless local area network (WLAN) 131 and a short-range communication module 132, and the multimedia module 140 includes at least one of a broadcasting communication module 141, an audio play module 142, and video play module 143. The camera module 150 includes at least one of a first camera 151 and a second camera 152; and the input/output module 160 includes at least one of buttons 161, a microphone 162, a speaker 163, a vibration motor 164, a connector 165, a keypad 166, and the earphone connector jack 167. Hereinafter, the display unit 190 and the display controller 195 may be e.g., a touchscreen and a touchscreen controller, respectively.

The controller 110 may include a central processing unit (CPU) 111, a read only memory (ROM) 112 for storing a control program to control the electronic device 100, and a random access memory (RAM) 113 for storing signals or data input from an external source or external device, or for being used as a memory space for working results in the electronic device 100. The CPU 111 may include a single core, dual cores, triple cores, or quad cores. The CPU 111, ROM 112, and RAM 113 may be connected to each other via an internal bus, represented by the arrows and lines in the controller 110 in FIG. 1.

The controller 110 may control the mobile communication module 120, the sub-communication module 130, the multimedia module 140, the camera module 150, the GPS module 155, the input/output module 160, the sensor module 170, the storage or memory 175, the power supply 180, the touchscreen 190, and the touchscreen controller 195.

The mobile communication module 120 uses at least a one-to-one antenna or a one-to-more antenna under the control of the controller 110 to connect the electronic device 100 to an external device through a mobile communication. The mobile communication module 120 transmits/receives wireless signals for voice calls, video conference calls, short message service (SMS) messages, or multimedia message service (MMS) messages to/from a cell phone, a smart phone, a tablet PC, or another device, with the phones having phone numbers entered into the electronic device 100.

The sub-communication module 130 may include at least one of the WLAN module 131 and the short-range communication module 132. For example, the sub-communication module 130 may include either the WLAN module 131 or the short-range communication module 132, or both.

The WLAN module 131 may be connected to the Internet and/or other networks in a place where there is a wireless access point (AP), under the control of the controller 110. The WLAN module 131 supports the IEEE's WLAN standard IEEE802.11x. The short-range communication module 132 may conduct near-field communication between the electronic device 100 and an image rendering device under the control of the controller 110. The near-field communication may be performed using BLUETOOTH™, a short range wireless communications technology at the 2.4 GHz band, commercially available from the BLUETOOTH SPECIAL INTEREST GROUP, INC., infrared data association (IrDA), WI-FI DIRECT, a wireless technology for data exchange over a computer network, commercially available from the WI-FI ALLIANCE, NFC, etc.

The electronic device 100 may include at least one of the mobile communication module 120, the WLAN module 131 and the short-range communication module 132 based on the performance requirements of the electronic device 100. For example, the electronic device 100 may include a combination of the mobile communication module 120, the WLAN module 131 and the short-range communication module 132 based on the performance requirements of the electronic device 100.

The multimedia module 140 may include the broadcasting communication module 141, the audio play module 142, or the video play module 143. The broadcasting communication module 141 may receive broadcast signals (e.g., television broadcast signals, radio broadcast signals, or data broadcast signals) and additional broadcast information (e.g., an electronic program guide (EPG) or an electronic service guide (ESG)) transmitted from a broadcasting station through a broadcast communication antenna under the control of the controller 110. The audio play module 142 may play digital audio files (e.g., files having audio extensions, such as mp3, wma, ogg, or wav) stored or received under the control of the controller 110. The video play module 143 may play digital video files (e.g., files having video extensions, such as mpeg, mpg, mp4, avi, move, or mkv) stored or received under the control of the controller 110. The video play module 143 may also play digital audio files.

The multimedia module 140 may include the audio play module 142 and the video play module 143 and, in alternative embodiments, may omit the broadcast communication module 141. The audio play module 142 or video play module 143 of the multimedia module 140 may be included in the controller 110.

The camera module 150 may include at least one of the first and second cameras 151 and 152 for capturing still images or video images under the control of the controller 110. Furthermore, the first or second camera 151 or 152 may include an auxiliary light source (e.g., a flash 153, shown in FIG. 3) for providing as much an amount of light as required for capturing images. The first camera 151 may be placed on the front of the electronic device 100 and the second camera 152 may be placed on the back of electronic device 100. In an alternative configuration, the first and second cameras 151 and 152 are arranged adjacent to each other (e.g., the distance between the first and second cameras 151 and 152 may be in the range of 1 cm. to 8 cm.), for capturing 3D still images or 3D video images.

The GPS module 155 receives radio signals from a plurality of GPS satellites in Earth orbit, and may calculate the position of the electronic device 100 by using times of arrival of the radio signals from the GPS satellites to the electronic device 100.

The input/output module 160 may include at least one of the plurality of buttons 161, the microphone 162, the speaker 163, the vibration motor 164, the connector 165, the keypad 166, and the earphone connector jack 167.

Figure 2:
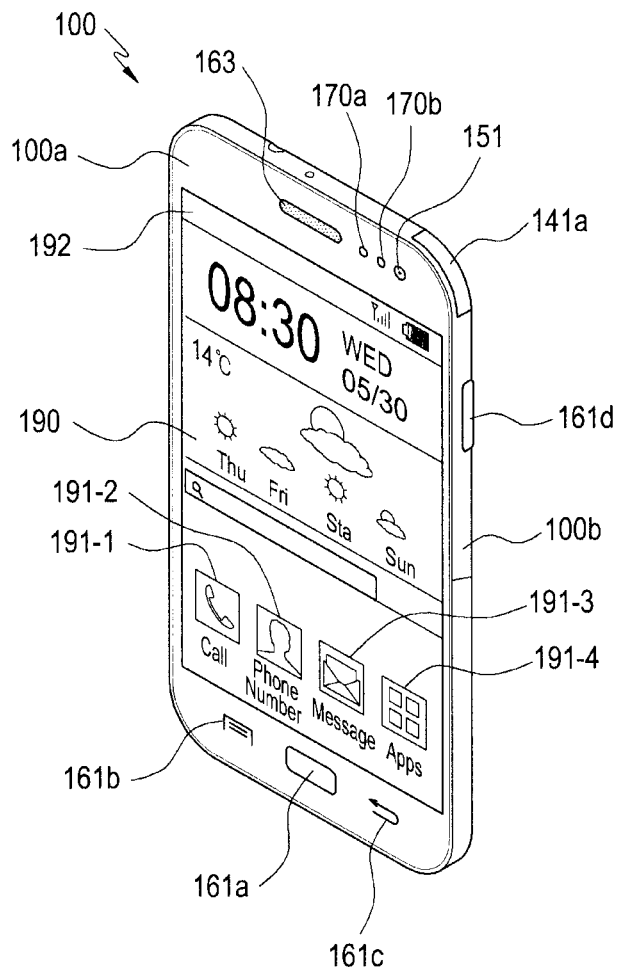
FIG. 2 is a front view of the electronic device, according to the exemplary embodiment of the present invention.
Figure 3:
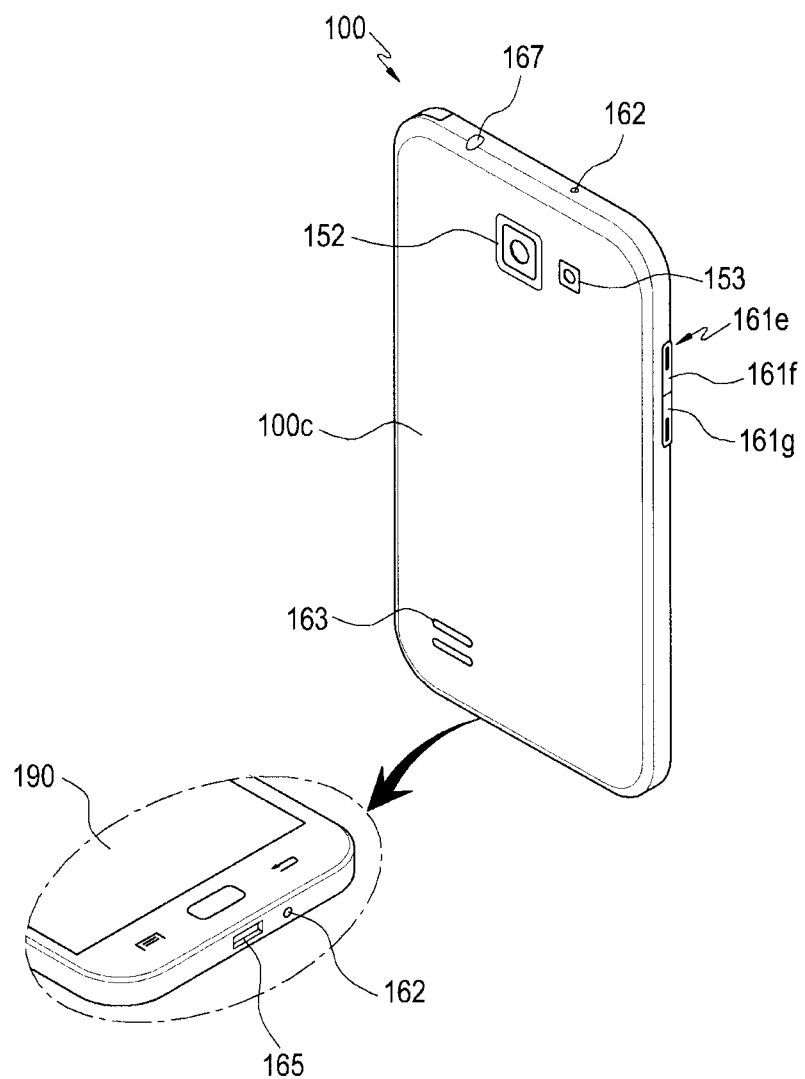
FIG. 3 is a rear view of the electronic device, according to the exemplary embodiment of the present invention.

The at least one of the buttons 161 may be arranged on the front, side, or back of a housing of the electronic device 100, and may include at least one of a power/lock button, a volume button, a menu button, a home button, a back button, and a search button, as shown in more detail in FIGS. 2-3.

The microphone 162 generates electric signals by converting received voice or sound under the control of the controller 110.

The speaker 163 may output sounds externally, with the sounds corresponding to various signals (e.g., radio signals, broadcast signals, digital audio files, digital video files or photography signals) from the mobile communication module 120, the sub-communication module 130, the multimedia module 140, or the camera module 150 under the control of the controller 110. The speaker 163 may output sounds (e.g., button-press sounds or ringback tones) that correspond to functions performed by the electronic device 100. There may be one or multiple speakers 163 arranged in an appropriate position or appropriate positions of the housing of the electronic device 100.

The vibration motor 164 may convert an electric signal to a mechanical vibration under the control of the controller 110. For example, the electronic device 100 in a vibrating mode operates the vibration motor 164 when receiving a voice call from another device. There may be one or more vibration motors 164 inside the housing of the electronic device 100. The vibration motor 164 may operate in response to a touch activity or continuous touches of a user over the touchscreen 190.

The connector 165 may be used as an interface for connecting the electronic device 100 to the external device or a power source. Under the control of the controller 110, the electronic device 100 may transmit data stored in the storage or memory 175 of the electronic device 100 to the external device via a cable connected to the connector 165, or may receive data from the external device. Furthermore, the electronic device 100 may be powered by the power source via a cable connected to the connector 165 or may charge the battery, as the power supply 180, with the power source.

The keypad 166 may receive key inputs from the user to control the electronic device 100. The keypad 166 includes a physical keypad formed in the electronic device 100, or a virtual keypad displayed on the touchscreen 190. The mechanical keypad formed in the electronic device 100 may be, in an alternative embodiment, omitted from the electronic device 100, depending on the performance requirements or the structure of the electronic device 100.

An earphone may be inserted into the earphone connector jack 167 and thus connected to the electronic device 100.

The sensor module 170 includes at least one sensor for detecting a status of the electronic device 100. For example, the sensor module 170 may include a proximity sensor for detecting proximity of a user to the electronic device 100; an illumination sensor for detecting an amount of ambient light of the electronic device 100; a motion sensor for detecting any motion of the electronic device 100 (e.g., a rotation of the electronic device 100, an acceleration or a vibration applied to the electronic device 100); a geomagnetic sensor for detecting a direction using the geomagnetic field of the Earth; a gravity sensor for detecting a direction of gravity; and an altimeter for detecting an altitude of the electronic device 100 by measuring, for example, atmospheric pressure. At least one sensor may detect the status and generate a corresponding signal to be transmitted to the controller 110. The sensor of the sensor module 170 may be added or removed depending on the performance requirements of the electronic device 100.

The storage or memory 175 may store signals or data input/output according to operations of the mobile communication module 120, the sub-communication module 130, the multimedia module 140, the camera module 150, the GPS module, the input/output module 160, the sensor module 170, and the touchscreen 190 under the control of the controller 110. The storage or memory 175 may store data as well as the control programs and applications for controlling the electronic device 100 or the controller 110.

The term "storage" refers to not only the storage or memory 175, but also the ROM 112 and the RAM 113 in the controller 110, or a memory card (e.g., an SD card, a memory stick) installed in the electronic device 100. The storage or memory 175 may also include a non-volatile memory, a volatile memory, a hard disc drive (HDD), or a solid state drive (SSD).

The power supply 180 may supply power to one or more batteries arranged inside the housing of the electronic device 100 under the control of the controller 110. The one or more batteries power the electronic device 100. The power supply 180 may supply the electronic device 100 with the power input from the external power source via a cable connected to the connector 165. The power supply 180 may also supply the electronic device 100 with wireless power from an external power source based on a wireless charging technology.

The display unit 190 may display a screen of the electronic device 100. The display unit 190 may be the touchscreen, and may provide the user with a user interface for various services (e.g., call, data transmission, broadcasting, and photography services). The touchscreen 190 may send an analog signal, corresponding to at least one touch input to the user interface, to the touchscreen controller 195. The touchscreen 190 may receive the at least one touch from user's physical contact (e.g., with fingers including the thumb), or via a touchable input device (e.g., a stylus pen). The touchscreen 190 may receive consecutive moves of the at least one input touch. The touchscreen 190 may send an analog signal corresponding to the consecutive moves of the input touch to the touchscreen controller 195.

Here, the touch is not limited to the user's physical contact or the touchable input device, and may include non-touches. The detectable distance from the touchscreen 190 may vary depending on the performance requirements or structure of the electronic device 100.

The touchscreen 190 may be implemented by, e.g., a resistive type, a capacitive type, an infrared type, or an acoustic wave type touchscreen known in the art.

The touchscreen controller 195 converts the analog signal received from the touchscreen 190 to a digital signal (e.g., XY coordinates) and transmits the digital signal to the controller 110. The controller 110 may control the touchscreen 190 by using the digital signal received from the touchscreen controller 195. For example, in response to the touch, the controller 110 may enable a shortcut icon displayed on the touchscreen 190 to be selected or to be executed. The touchscreen controller 195 may also be incorporated in the controller 110.

FIG. 2 is a front view of the electronic device 100, according to the exemplary embodiment of the present invention. FIG. 3 is a rear view of the electronic device 100, according to the exemplary embodiment of the present invention.

Referring to FIG. 2, the touchscreen 190 is arranged in the center of the front face 100a of the electronic device 100. The touchscreen 190 is formed to be large enough to occupy most of the front face 100a of the apparatus implementing the electronic device 100. In FIG. 2, the touchscreen 190 shows an example of displaying a main home screen. The main home screen may be a first screen to be displayed on the touchscreen 190 when the electronic device 100 is powered on. In a case that the electronic device 100 has multiple pages of different home screens, the main home screen may be the first of the home screens. In the main home screen, shortcut icons 191-1, 191-2, 191-3 for running frequently-used applications, as well as a main menu key 191-4, a time indicator, a weather indicator, etc. may be displayed. If selected, the main menu key 191-4 displays a menu screen on the touchscreen 190. In an upper part of the touchscreen 190, there may be a status bar 192 in which statuses of the electronic device 100, such as a battery charging state, intensity of received signals, current time, etc. are displayed.

In a lower part of the touchscreen 190, there may be a home button 161a, a menu button 161b, and a back button 161c arranged to be conveniently selected while holding the electronic device 100.

When selected, the home button 161a displays the main home screen on the touchscreen 190. For example, if the home key 161a is touched while any home screen other than the main home screen or a menu screen is displayed in the touchscreen 190, the main home screen may be displayed on the touchscreen 190. Furthermore, while applications are running on the touchscreen 190, if the home button 161a is touched, the main home screen, as shown in FIG. 2, may be displayed on the touchscreen 190. The home button 161a may also be used to display recently used applications or a task manager on the touchscreen 190.

The menu button 161b provides a link menu that may be used on the touchscreen 190. The link menu may include a widget addition menu, a background change menu, a search menu, an edit menu, an environment setting menu, etc.

A back button 161c, when touched, may display a screen that was displayed right before a current screen was displayed, or may end a most recently used application.

On at least one edge of the front face 100a of the electronic device 100, shown in FIG. 2, the first camera 151, the illumination sensor 170a, and the proximity sensor 170b may be arranged. On the back 100c of the electronic device 100, shown in FIG. 3, the second camera 152, the flash 153, and the speaker 163 may be arranged.

Referring to FIGS. 2-3, on at least one side 100b of the electronic device 100, e.g., a power/reset button 161d, a volume button 161e with a volume-up button 161f and a volume-down button 161g, a terrestrial DMB antenna 141a for broadcast reception, one or more microphones 162, etc. may be arranged. The DMB antenna 141a may be fixed to the electronic device 100, or may be removably arranged.

On at least one lower side of the electronic device 100, shown in FIG. 3, the connector 165 and the microphone 162 are arranged. The connector 165 has at least one electrode or jack, and may be connected to an external apparatus via a cable. On at least one upper side of the electronic device 100 shown in FIGS. 2-3, the earphone connector jack 167 may be positioned. The earphone connector jack 167 may receive a plug of an external earphone.

Figure 4:
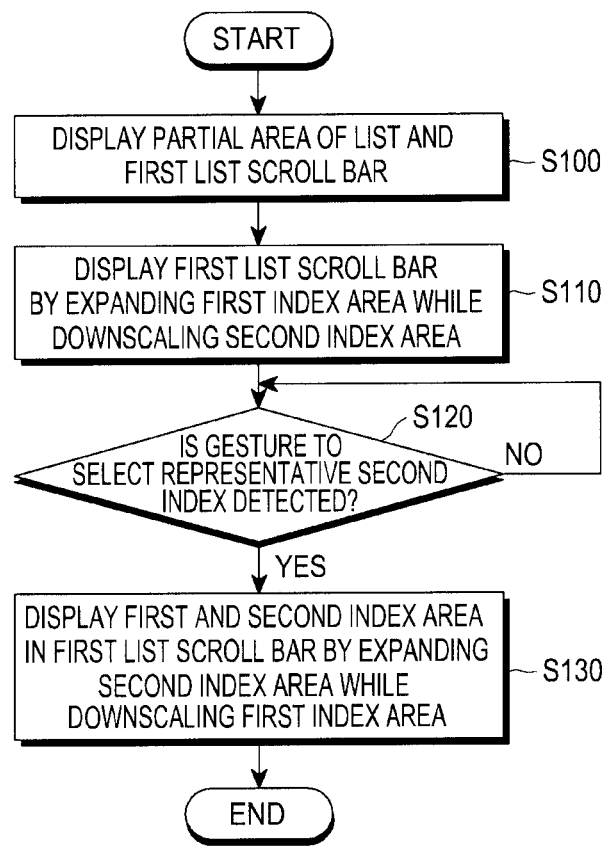
FIG. 4 is a flowchart, according to the exemplary embodiment of the present invention.

FIG. 4 is a flowchart, according to the exemplary embodiment of the present invention. FIGS. 5A-5D illustrate diagrams representing a method of controlling a list scroll bar, according to the exemplary embodiment of the present invention.

Referring both FIGS. 4 and 5A-5D, first, the method of controlling the list scroll bar 230 includes displaying a partial area of a list and a first list scroll bar 230, in step S100. The controller 110 of the electronic device 100 may display the partial area of the list including at least one item formed of at least one of characters, numbers, and symbols, and the first list scroll bar for scrolling the list on the touchscreen 190 of the electronic device 100.

The electronic device 100 may store the at least one item. The at least one item may be included in the list. The at least one item included in the list is stored in the electronic device 100. For example, a contacts list may include at least one contact corresponding to the at least one item. In other words, the at least one contact, e.g., 200 contacts stored by a user may be included in the contacts list and may be stored in the electronic device 100. The contacts may be formed of at least one of characters, numbers, and symbols. For example, a contact called "김철수" may be formed from characters and symbols in Korean alphabets, such as Hangul. There may be another contact called "1st street shop", consisting of an Arabic number '1' and English characters. There may be a further contact called "#kind", consisting of a symbol "#" and English characters. In another example, the list may be an applications list including at least one application, which may be operated or executed by the controller 110, as at least one item. In other words, at least one application, e.g., 50 applications stored by a user may be included in the applications list and may be stored in the electronic device 100. The identifiers of applications, such as titles or file names, may be formed of at least one of characters, numbers, and symbols. For example, an application called "note" may be formed of English characters. Another application called "갤러리" may be formed of Korean characters "갤러리" and a number "2". In another example, the list may be a music list including at least one piece of music as the at least one item. In other words, at least one piece of music, e.g., 150 pieces of music stored by a user may be included in the music list and be stored in the electronic device 100. The at least one piece of music may be formed of at least one of characters, numbers, and symbols. For example, a piece of music called or identified as "Girl" may be formed of English characters. Another piece of music called or identified as "track 1" may be formed of English characters and a number "1". There may be a further piece of music called "#OASIS", consisting of a symbol "#" and English characters "OASIS".

The at least one item may be sequentially arranged in the list. The at least one item consisting of at least one of characters, numbers, and symbols may be arranged in the list in the sequence of characters, numbers, or symbols. The order of the sequence may be determined in advance. For example, the order may be in Korean (consonant and vowel) alphabetical order, English alphabetical order, or numerical order. The at least one item may be sequentially arranged depending on a first character of the at least one item. For example, the at least one item may be sequentially arranged in Korean alphabetical order, English alphabetical order, or numerical order of the first letter of the at least one item. For example, if the list has items "Bob", "Alice", and "Charlie", the items of the list may be arranged in the alphabetical order of the first letters 'a', 'b', and 'c' of the items, i.e., in the order of "Alice", "Bob", and "Charlie". In another example, if the list has items "노정수", "도재연", and "고상준", the items of the list may be arranged in the Korean alphabetical order of the first letters '고', '노', and '도' of the items, i.e., in the order of "고상준", "노정수", and "고재연". In a further example, if the list has items "23lady", "34포스" and "1 jason", the items of the list may be arranged in the numerical order of the first letters '1', '2', and '3' of the items, i.e., in the order of "1 jason", "23lady", and "34포스". Furthermore, if the list has items "#plus", "+nice", and "−jay", the items of the list may be arranged in a rule of the symbolic order of the first symbols or characters '+', '−', and '#' of the items, i.e., in the order of "+nice", "−jay", and "#plus".

The at least one item may correspond to any of a first language item, a second language item, a number item, or a symbol item based on its first letter, character, number, or symbol. For example, at least one first language item may be at least one first item with the first letter in Korean (or beginning with a Korean letter). In other words, the at least one first language item may be an item with the first letter in Korean (or beginning with a Korean letter), such as "고상준", "노정수", or "도재연". At least one second language item may be at least one second item with the first letter in English (or beginning with an English letter). In other words, the at least one second language item may be an item with the first letter in English (or beginning with an English letter), such as "Alice", "Bob", or "Charlie". The at least one number item may be at least one third item with the first letter of a numeric value (or beginning with a number). In other words, the at least one number item may be an item with the first letter of a numeric value (or beginning with a number), such as "1 jason", "23lady", or "34포스". The at least one symbol item may be at least one fourth item with a symbol for the first letter (or beginning with a symbol). In other words, the at least one symbol item may be an item with a symbol for the first letter (or beginning with a symbol), such as "+nice", "−jay", or "#plus". The at least one number or symbol item may be at least one fifth item with a number or symbol for the first letter (or beginning with a number or symbol). In other words, the at least one number or symbol item may be an item with a number or symbol for the first letter (or beginning with a number or symbol), such as "1nice", "7jay", or "#plus".

The controller 110 may generate at least one index corresponding to the at least one item based on the first letter of the at least one item. For example, if first items are "고상준", "노정수", and "도재연" consisting of Korean alphabets, the controller 110 may generate first indexes "ㄱ", "ㄴ", and "ㄷ" corresponding to the first items. If second items are "Alice", "Bob", and "Charlie" consisting of English alphabets, the controller 110 may generate second indexes "A", "B", and "C" corresponding to the second items. If third items are "1 jason", "23lady", and "34포스" including numbers, the controller 110 may generate third indexes "1", "2", and "3" corresponding to the third items. If fourth items are "+nice", "−jay", and "#plus" including symbols, the controller 110 may generate fourth indexes "+", "−", and "#" corresponding to the fourth items.

The list may be displayed on the touchscreen 190 of the electronic device 100. That is, the controller 110 of the electronic device 100 may control the list to be displayed on the touchscreen 190. In this regard, the controller 110 may display the at least one item included in the list on the touchscreen 190. As described above, the at least one item may be sequentially arranged in the list.

Only a partial area of the list may be displayed on the touchscreen 190 depending on the number of the at least one item. That is, there may be an instance that not all of the at least one item may be displayed depending on a size of an area in which each of the at least one item is to be displayed. For example, there may be an instance that only 10 of the at least one item of a total of 200 items are displayed on the touchscreen 190 due to the limit of the screen size. In other words, in the case of displaying only 10 items on the touchscreen 190 depending on each size of the at least one item, only the partial area containing the 10 items of the list is displayed on the touchscreen 190 and the remaining 190 items may not be displayed on the touchscreen 190.

The controller 110 may display the at least one index corresponding to the at least one item on the touchscreen 190. As described above, the controller 110 may generate the at least one index corresponding to the at least one item, and the controller 110 may display the generated at least one index on the touchscreen 190. The controller 110 may sequentially arrange the at least one item in the list and display the list on the touchscreen 190, and may also sequentially arrange the at least one index corresponding to the sequentially arranged at least one item and display the at least one index on the touchscreen 190. The controller 110 may display at least one first index corresponding to the at least one first item (e.g., the first language) and at least one second index corresponding to the at least one second item (e.g., the second language) on the touchscreen 190, simultaneously. The at least one first index may be sequentially displayed on the touchscreen 190 according to the sequentially arranged at least one first item, and the at least one second index may be sequentially displayed on the touchscreen 190 according to the sequentially arranged at least one second item.

The controller 110 may display an index area including the at least one index in the list scroll bar. The index area includes the at least one index, and the list scroll bar includes at least one index area and may be displayed in a bar shape on the touchscreen 190. In other words, a first index area including at least one first index that corresponds to the at least one first item (e.g., the first language) and a second index area including at least one second index that corresponds to the at least one second item (e.g., the second language) may be displayed in the list scroll bar.

The controller 110 may detect scrolling across or up or down the list scroll bar and control the list to be scrolled according to the detected scrolling. The controller 110 may detect scrolling across the index area included in the list scroll bar and control the list to be scrolled accordingly. In other words, the controller 110 may detect scrolling across indexes included in the index area and then scrolls the list to display items corresponding to the indexes. In this case, the controller 110 may scroll the list to display a partial area of the list that includes first items having letters starting with the index. For example, upon detecting scrolling across indexes 'ㄷ' to 'ㅁ', the controller 100 scrolls the list from a partial area of the list including first items starting with 'ㄷ' to a partial area including first items starting with 'ㅁ'.

Detecting a gesture to select an index included in the list scroll bar, the controller 110 may control the list to jump over to the items having first letters starting with the selected index. That is, the controller 110 may detect the gesture to select the index included in the list scroll bar and then control the list to jump to and display a partial area of the list including the items having first letters starting with the selected index. For example, if a gesture to select an index 'ㄷ' is detected by the controller 110 while items having first letters starting with an index 'ㄷ' are displayed on the touchscreen 190, the controller 110 may jump to a partial area of the list including first items having letters starting with the index 'ㄷ' and display the partial area on the touchscreen 190.

Step S100, described above, may be described in detail with reference to FIGS. 5A-5D. In FIG. 5A, for example, the touchscreen 190 shows that a contacts application is running in the electronic device 100. The contacts application includes a contacts list 200. The contacts list 200 may include at least one item 210. The at least one item 210 may be at least one contact stored in the electronic device 100. The at least one contact may be formed of at least one of characters, numbers, and symbols.

At least one first item may be at least one first language item starting with a first language, such as English. At least one second item may be at least one second language item starting with a second language, such as Korean. At least one third item may be at least one number or symbol item starting with a number or symbol. The contacts list 200 may include the at least one first language item, the at least one second language item, or the at least one number or symbol item. The at least one first language item in the first language, such as English, may start with any of 'A' to 'Z', the at least one second language item in the second language, such as Korean, may start with any of 'ㄱ' to 'ㅎ', and the at least one number or symbol item consisting of numbers or symbols may start with any of '1' to '#'.

In FIG. 5A, items 210, indicating C Items 1 to 7 starting with 'C' and items 212 indicating D items 1 to 4 starting with 'D' among the at least one first language item starting with any of 'A' to 'Z' are displayed on the touchscreen 190 in sections 220, 222, respectively. C Item 1 refers to a first item among the at least one item starting with 'C' sequentially arranged in an order. Specifically, C Item 1 to 7 refer to first to seventh items among the at least one first language item starting with 'c' sequentially arranged in alphabetical order. In FIG. 5A, C Items 1 to 7 and D Items 1 to 4 among the first language items of the contacts list 200 are sequentially arranged and displayed in the alphabetical order on the touchscreen 190. However, not all items included in the contacts list 200 may be displayed on the touchscreen 190 and so, only a partial area of the contacts list including C Item 1 to 7 and D Item 1 to 4 among the first language items of the contacts list 200 is displayed on the touchscreen 190 of FIG. 5A. The contacts list 200 may also include the at least one second language item starting with the second language and the at least one number or symbol item starting with a number or symbol, but, due to the limit of screen size, the at least one second language item and the at least one number or symbol item are not displayed on the touchscreen 190 in FIG. 5A.

The controller 110 may generate and display the at least one index corresponding to the at least one item on the touchscreen 190. Since the at least one first language item starts with an English letter, the controller 110 may generate 'A' to 'Z' as the at least one first index corresponding to the at least one first language item. The controller 110 may display the at least one first index 240 on the touchscreen 190, as shown in FIG. 5A, with section indicators 270, 272 indicating the sections 220, 222 of items 210, 212, respectively. The at least one first index 240 may be sequentially arranged and displayed in the first index area 250. In this regard, the at least one first index 240 may be included in the first index area 250 to be displayed in the list scroll bar 230.

Since the at least one second language item starts with a Korean character, the controller 110 may generate 'ㄱ' to 'ㅎ' as the at least one second index corresponding to the at least one second language item. The controller 110 may display the at least one second index on the touchscreen 190, as shown in FIG. 5D. The at least one second index 340 may be sequentially arranged and displayed in the second index area 350. In this regard, the at least one second index 340 may be included in the second index area 350 to be displayed in the list scroll bar 230.

Since the at least one number or symbol item starts with a number or symbol, the controller 110 may generate '1' to '#' as the at least one third index 460 corresponding to the at least one number or symbol item. The controller 110 may display the at least one third index 460 on the touchscreen 190, as shown in FIG. 5A. The at least one third index may be sequentially arranged and displayed in the third index area 450. In this regard, the at least one third index 460 may be included in the third index area 450 to be displayed in the list scroll bar 230.

The first index area 250, the second index area 350, and the third index area 450 may come in different colors or different shapes. For example, the first index area 250 may be displayed in red on the touchscreen 190; the second index area 350 in blue; and the third index area 450 in green.

Next, referring to FIG. 4, the method of controlling the list scroll bar includes displaying the first index area 250 and the second index area 350 in the first list scroll bar 230 by expanding the first index area 250 while downscaling the second index area 350, in step S110. The controller 110 of the electronic device 100 may expand and display the first index area 250 including the at least one first index 240 that corresponds to the at least one first item in the first list scroll bar 230, while displaying a representative second index 360 in the first list scroll bar 230 on behalf of the second index area 350 by downscaling the second index area 350 including the at least one second index 340 corresponding to the at least one second item, different from the at least one first item. The controller 110 may also display a representative third index 460 in the first scroll bar 230 on behalf of the third index area 450 by downscaling the third index area 450 including the at least one third index corresponding to the at least one number or symbol item. When expanding the first index area 250 for display, the controller 110 may display all of the at least one first index in the list scroll bar 230, or may display some of the at least one first index in the list scroll bar 230.

In other words, the controller 110 may display all of the at least one first index 240 in the first list scroll bar 230 when expanding the first index area 250 for display. For example, if the at least one first index 240 is formed of 'A' to 'Z' according to the at least one first language item starting with the first language, such as English, as shown in FIG. 5A, the controller 110 may display all of the at least one first index 'A' to 'Z' in the first index area 250 when expanding and displaying the first index area 250. On the other hand, the controller 110 may display some of the at least one first index 240 in the first list scroll bar 230 when expanding the first index area 250 for display. For example, the controller 110 may display some of the at least one first index, e.g., A, D, G, K, O, V, and Z, in the first index area 250 when expanding the first index area 250 for display.

The controller 110 may also display the representative second index 360 in the first scroll bar 230 on behalf of the second index area 350 by downscaling the second index area 350 including the at least one second index corresponding to the at least one second item, different from the at least one first item. For example, in FIG. 5A, the second index area 350 including the at least one second index corresponding to the at least one second language item starting with the second language, such as Korean, is scaled down and the representative second index 360 is included in the first list scroll bar 230 on behalf of the second index area 350 and displayed on the touchscreen 190. That is, the at least one second language item, different from the first language item, starts with the second language, such as Korean. The controller 110 may generate 'ㄱ' to 'ㅎ' as the at least one second index corresponding to the at least one second language item. When scaling down and displaying the second index area 350 in the first list scroll area 230, the controller 110 may display one of the at least one second index, e.g., 'ㅎ' as the representative second index 360 in the second index area 350. The representative second index 360 may be the first or the last of the at least one second index 340 sequentially arranged in an order. The second index area 350 including the representative second index 360 may be included in the first list scroll bar 230 for display. The controller 110 may also display a representative third index 460 in the first scroll bar 230 on behalf of the third index area 450 by downscaling the third index area 450 including the at least one third index corresponding to the at least one number or symbol item, in the same way of downscaling the second index area 350.

Referring to FIG. 5B, upon detecting scrolling across the first index area 250 including the at least one first index 240, the controller 110 may scroll the list 200 for display according to the detected scrolling. Upon detecting scrolling across the second index area 350 including the at least one second index 340, the controller 110 may scroll the list for display according to the direction of the detected scrolling. That is, the controller 110 may detect scrolling across, up, or down the first index area 250 included in the first list scroll bar 230 and scroll the list 200 accordingly. The controller 110 may scroll the list 200 according to the first index 240 included in the first list scroll bar 230. In other words, upon detecting scrolling 402 over 'F' among the first indexes, as shown in FIG. 5B, the controller 110 may scroll the list 200 to a selected section indicator 274, for example, for the items starting with "F" to display the first language items starting with 'F'. That is, as shown FIG. 5B, upon detecting the scrolling 402 over 'F' among the first indexes, the controller 110 may scroll the list 200 to the at least one first language item 214 starting with 'F'. The controller 110 may also display an 'F' section 224 on the touchscreen 190 when the list 200 is scrolled to display 'F' indexes. Furthermore, in case of being able to display all of the at least one first language item 214 starting with 'F' on the touchscreen 190, the controller 110 may also display at least one first language item 216 starting with next letter 'G' in the English alphabet and a 'G' section 226 on the touchscreen 190. In addition, upon detecting a gesture to select one of the at least one first index, the controller 110 may jump over the list 200 to the selected first index for display. Also, upon detecting a gesture to select one of the at least one second index, the controller 110 may jump over the list 200 to the selected second index. For example, in FIG. 5B, upon detecting a gesture to select the index 'F' among the first indexes, the controller 110 may jump over the list 200 to the first language items 214 starting with the selected first index 'F' and display the first language items 214 immediately. The gesture may be a touch on the first index. The touch may be any of e.g., one tap, double taps, and a long touch.

Then, the method of controlling the list scroll bar 230 according to the exemplary embodiment of the present invention includes determining whether the gesture to select the representative second index 360 is detected, in step S120. If no gesture is detected in step S120, the method loops back to repeat step S120 until a gesture is detected. Once a gesture is detected, the method proceeds to step S130. Referring to FIG. 5C, the controller 110 may detect the gesture 404 to select the representative second index 360. The gesture may be scrolling from the first index area 250 to the representative second index 360, or may be a touch on the representative second index 360. The representative second index 360 refers to an index that represents the at least one second index area 350 corresponding to the at least one second language item. In FIG. 5B, the representative second index 360, 'ㅎ', among the at least one second index, 'ㄱ' to 'ㅎ', that correspond to the at least one second language item in the second language, such as Korean, is displayed on the touchscreen 190. Thus, the controller 110 may detect whether the representative second index 360 is selected by detecting a touch on 'ㅎ' displayed as the representative second index. The controller 110 may detect a gesture to select the representative third index 460 in the same way of detecting the gesture to select the representative second index 360. The gesture may be scrolling from the first index area 250 to the representative third index 460, or may be a touch on the representative third index 460.

Next, the method of controlling the list scroll bar 230 includes displaying the first index area 250 and the second index area 350 in the first list scroll bar 230 by downscaling the first index area 250 while expanding the second index area 350, in step S130. Upon detecting the gesture to select the representative second index 360, the controller 110 may expand and display the second index area 350 in the first list scroll bar 230, while downscaling the first index area 250 and displaying the representative first index 260 in the first list scroll bar 230. In step S120, as shown in FIG. 5C, upon detecting the gesture to select the representative second index 360, the controller 110 may expand and display the second index area 350, as shown in FIG. 5D while downscaling the first index area 250 for display. That is, the controller 110 may expand the second index area 350 including the selected representative second index 360 and display all of the at least one second index 340 included in the second index area 350 in the first list scroll bar 230. For example, the controller 110 may display 'ㄱ' to 'ㅎ', that is, all of the at least one second index 340, as shown in FIG. 5D, in the list scroll bar 230. On the other hand, the controller 110 may display some of the at least one second index 340 in the first list scroll bar 230 when expanding the second index area 350 for display. That is, the controller 110 may display some of the at least one second index 340, e.g., 'ㄱ', 'ㅁ', 'ㅅ', 'ㅋ', and 'ㅎ' included in the second index area 350 in the first list scroll bar 230.

On the contrary, the controller 110 downscales the first index area 250 for display. That is, the controller 110 may downscale the first index area 250 and display the representative first index 260 on behalf of the at least one first index, e.g., 'A' to 'Z', included in the first index area 250. The representative first index 260 may be the first or the last of the sequentially arranged at least one first index 240. For example, the controller 110 may display 'A' as the representative first index 260 of the first index area 250 in the list scroll bar 230, as shown in FIG. 5D.

Furthermore, upon detecting the gesture to select the representative third index 460, the controller 110 may expand and display the third index area 450 in the first list scroll bar 230, in the same way of expanding and displaying the second index area 350 in the first list scroll bar 230. In addition, the controller 110 may downscale the first index area 250 and display the representative first index 260 on behalf of the first index area 250 in the first list scroll bar 230.

Therefore, the method of controlling the list scroll bar 230 according to the exemplary embodiment of the present invention facilitates scrolling of the list by displaying the plurality of index areas 250, 350, 450 on the touchscreen 190. In other words, the present invention takes advantage of each index area included in the scroll bar 230 to scroll the list by expanding or downscaling each index area 250, 350, 450. That is, expanding the each index area 250, 350, 450 to scroll indexes included in the list scroll bar 230 facilitates quick scrolling of the list by touching an index included in the expanded index area. To scroll the list to the second indexes included in the second index area 350 downscaled as in FIGS. 5A-5B, the controller 110 may detect the gesture to select the representative second index 360 that represents the second index area 350 and then expand the second index area 350. A touch or scrolling of a second index included in the second index area 350 may cause the list 200 to be scrolled to the second items corresponding to the second index. Thus, in the case of a list having items starting with a plurality of languages, e.g., the contacts list having first language items and second language items in English and Korean, respectively, as shown in FIGS. 5A-5D, expanding or downscaling of the first index area 250 or the second index area 350 according to the exemplary embodiment of the present invention facilitates easy scrolling of the contacts list to display indexes included in the each index area by expanding or downscaling the first index area 250 or second index area 350.

FIGS. 6A-6D illustrate diagrams representing a second example, according to the exemplary embodiment of the present invention.

In a method of controlling the list scroll bar 230 according to the second example of the present invention, in determining whether there is the gesture to select the representative second index, the gesture may be scrolling from the first index area 250 to the second index area 350. Referring to FIGS. 4 and 6A-6D, specifically, in the method of controlling the list scroll bar 230, a partial area of the list 200 and the first list scroll bar 230 are displayed, in step S100 of FIG. 4. Referring to FIG. 6A, the contacts list 200 is displayed on the touchscreen 190 of the electronic device 100. The contacts list 200 may include at least one first language item starting with a first language, such as Korean, at least one second language item starting with a second language, such as English, and at least one number or symbol item starting with a number or symbol. The controller 110 of the electronic device 100 may display a partial area of the contacts list 200 on the touchscreen 190. In FIG. 6A, e.g., items 210 starting with a letter 'ㅎ' among the at least one first language item are displayed. ㅎ Item 1 refers to a first item among the at least one first language item starting with 'ㅎ'. The controller 110 may also display a 'ƒ' section 220 indicating that items starting with 'ㅎ' are on the touchscreen 190.

The controller 110 may generate 'ㄱ' to 'ㅎ' as the at least one first index 240 corresponding to the at least one first language item starting with a Korean character and display the generated Korean characters on the touchscreen 190. In addition, the at least one first index 240 may be included in the first index area 250 to be displayed in the list scroll bar 230.

The contacts list 200 may also include at least one second language item starting with a second language, such as English, and the controller 110 may display the second index area 350 in the first list scroll bar 230 by having the second index area include the at least one second index corresponding to the at least one second language item.

The contacts list 200 may also include at least one number or symbol item starting with a number or symbol, and the controller 110 may display the third index area 450 in the first list scroll bar 230 by having the third index area 450 include the at least one third index corresponding to the at least one number or symbol item.

Next, referring to FIG. 4, the method of controlling the list scroll bar includes displaying the first index area 250 and the second index area 350 in the first list scroll bar 230 by expanding the first index area 250 while downscaling the second index area 350, in step S110. When expanding the first index area 250 for display, the controller 110 may display all of the at least one first index 240 in the list scroll bar 230, or may display some of the at least one first index 240 in the list scroll bar 230. On the other hand, the controller 110 may display the representative second index 360 that represents the second index area 350 in the first list scroll bar 230 when downscaling the second index area 350 for display. The controller 110 may display the representative third index 460 that represents the third index area 450 in the first list scroll bar 230 when downscaling the third index area 450 for display.

For example, referring to FIG. 6A, when expanding and displaying the first index area 250 including the at least one first index that corresponds to the at least one first language item starting with a Korean character, the controller 110 may display 'ㄱ' to 'ㅎ' corresponding to all of the at least one first index 240 in the first index area 250. Also, when expanding and displaying the first index area 250, the controller 110 may display some of the at least one first index, 'ㄱ', 'ㅁ', 'ㅇ', 'ㅈ', and 'ㅎ', in the first index area 250. On the contrary, when downscaling the second index area 350 that includes the at least one second index corresponding to the at least one second language item starting with an English letter, the controller 110 may display the representative second index 360 that represents the second index area 350 in the second index area 350. For example, referring to FIG. 6A, the controller 110 may display 'A' as the representative second index 360 among 'A' to 'Z' indexes that correspond to the at least one second language item in the second index area 350. Furthermore, the controller 110 may display '#' as the representative third index 460 among '1' to '#' indexes that correspond to the at least one number or symbol item in the third index area 450. The controller 110 may also display the first index area 250, the second index area 350, and the third index area 450 in the first list scroll bar 230.

Then, the method of controlling the list scroll bar 230 according to the exemplary embodiment of the present invention includes determining whether the gesture to select the representative second index 360 is detected, in step S120. The controller 110 may detect a gesture 406 as shown in FIG. 6B to select the representative second index 360, e.g., scrolling from the first index area 250 to the representative second index 360. For example, referring to FIG. 6C, the controller 110 may detect the gesture 408 to select the representative second index 360, e.g., the scrolling from the first index area 250 to the representative second index 360.

Furthermore, the controller 110 may detect a gesture to select the representative third index 460 in the same way of detecting the gesture to select the representative second index 360.

Next, the method of controlling the list scroll bar 230 includes step S130 of displaying the first index area 250 and the second index area 350 in the first list scroll bar 230 by downscaling the first index area 250 while expanding the second index area 350. For example, referring to FIG. 6D, expanding and displaying the second index area 350 including the at least one second index that corresponds to the at least one second language item starting with an English letter, the controller 110 may display 'A' to 'Z' corresponding to all of the at least one second index 340 in the second index area 350. Also, expanding and displaying the second index area 350, the controller 110 may display some of the at least one first index, 'A', 'F', 'M', 'O', and 'Z', in the second index area 350. On the contrary, downscaling and displaying the first index area 250 that includes the at least one first index corresponding to the at least one first language item starting with a Korean character, the controller 110 may display the representative first index that represents the first index area 250 in the first index area 250. For example, referring to FIG. 6D, the controller 110 may display 'ㅎ' as the representative first index 260 among 'ㄱ' to 'ㅎ' that correspond to the at least one first language item in the first index area 250. The controller 110 may also display the first index area 250 and the second index area 350 in the first list scroll bar 230. Thus, the controller 110 may detect the gesture to select the representative second index that represents the second index area 350 downscaled and displayed in step S110, and expand the second index area 350 again.

Furthermore, upon detecting a gesture to select the representative third index 460, the controller 110 may expand and display the third index area 450 in the first list scroll bar 230, in the same way of expanding and displaying the second index area 350 in the first list scroll bar 230.

According to the second example of the present invention, in determining whether there is a gesture to select the representative second index, the gesture may be scrolling from the first index area 250 to the second index area 350. Thus, detection of the scrolling across the representative second index may lead to expansion and display of the second index area 350.

FIGS. 7A-7D illustrate diagrams representing a third example, according to the exemplary embodiment of the present invention.

In a method of controlling the list scroll bar 230 according to the third example of the present invention, in determining whether there is a gesture to select the representative second index, the gesture may be a touch on the representative second index. Referring to FIGS. 4 and 7A-7D, specifically, in the method of controlling the list scroll bar 230, a partial area of the list 200 and the first list scroll bar 230 are displayed in step S100. Referring to FIG. 7A, the contacts list 200 is displayed on the touchscreen 190 of the electronic device 100. The contacts list 200 may include at least one first language item starting with a first language, such as English, at least one second language item starting with a second language, such as Korean, and at least one number or symbol item starting with a number or symbol.

The controller 110 of the electronic device 100 may display a partial area of the contacts list 200 on the touchscreen 190. In FIG. 7A, e.g., items 210 starting with a letter 'C' among the at least one first language item are displayed. C Item 1 refers to a first item among the at least one first language item starting with 'C'. The controller 110 may also display a 'C' section 220 that represents items starting with 'C' on the touchscreen 190.

The controller 110 may generate 'A' to 'Z' as the at least one first index 240 corresponding to the at least one first language item starting with an English letter and display the generated English letters on the touchscreen 190. In addition, the at least one first index 240 may be included in the first index area 250 to be displayed in the list scroll bar 230.

The contacts list 200 may also include at least one second language item starting with a second language, such as Korean, and the controller 110 may display the second index area 350 in the first list scroll bar 230 by having the second index area include the at least one second index corresponding to the at least one second language item.

The contacts list 200 may also include at least one number or symbol item starting with a number or symbol, and the controller 110 may display the third index area 450 in the first list scroll bar 230 by having the third index area 450 include the at least one third index corresponding to the at least one number or symbol item.

Next, referring to FIG. 4, the method of controlling the list scroll bar 230 includes displaying the first index area 250 and the second index area 350 in the first list scroll bar 230 by expanding the first index area 250 while downscaling the second index area 350, in step S110. When expanding the first index area 250 for display, the controller 110 may display all of the at least one first index in the list scroll bar 230, or may display some of the at least one first index in the list scroll bar 230. On the other hand, the controller 110 may display the representative second index 360 that represents the second index area 350 in the first list scroll bar 230 when downscaling the second index area 350 for display. The controller 110 may display the representative third index 460 that represents the third index area 450 in the first list scroll bar 230 when downscaling the third index area 450 for display.

For example, referring to FIG. 7A, when expanding and displaying the first index area 250 including the at least one first index that corresponds to the at least one first language item starting with an English letter, the controller 110 may display 'A' to 'Z' indexes corresponding to all of the at least one first index 240 in the first index area 250. Also, when expanding and displaying the first index area 250, the controller 110 may display some of the at least one first index, 'A', 'F', 'M', 'U', and 'Z', in the first index area 250. On the contrary, downscaling and displaying the second index area 350 that includes the at least one second index corresponding to the at least one second language item starting with a Korean character, the controller 110 may display the representative second index that represents the second index area 350 in the second index area 350. For example, referring to FIG. 7A, the controller 110 may display 'ㅎ' as the representative second index 360 among 'ㄱ' to 'ㅎ' indexes that correspond to the at least one second language item in the second index area 350. The controller 110 may also display a representative third index 460 in the first scroll bar 230 on behalf of the third index area 450 by downscaling the third index area 450 including the at least one third index corresponding to the at least one number or symbol item, in the same way of downscaling the second index area 350. The controller 110 may also display the first index area 250, the second index area 350, and the third index area 450 in the first list scroll bar 230.

Then, the method of controlling the list scroll bar 230 according to the exemplary embodiment of the present invention includes determining whether the gesture as shown in FIG. 7B to select the representative second index 360 is detected, in step S120. The controller 110 may detect the gesture to select the representative second index 360, e.g., a touch on the representative second index 360. For example, referring to FIG. 7C, the controller 110 may detect the gesture 410 to select the representative second index 360, e.g., the touch on the representative second index 360. Furthermore, the controller 110 may detect a gesture to select the representative third index 460 in the same way of detecting the gesture to select the representative second index 360.

Next, the method of controlling the list scroll bar 230 includes displaying the first index area 250 and the second index area 350 in the first list scroll bar 230 by downscaling the first index area 250 while expanding the second index area 350, in step S130. For example, referring to FIG. 7D, when expanding and displaying the second index area 350 including the at least one second index that corresponds to the at least one second language item starting with a Korean character, the controller 110 may display 'ㄱ' to 'ㅎ' indexes corresponding to all of the at least one second index 340 in the second index area 350. Also, expanding and displaying the second index area 350, the controller 110 may display some of the at least one second index, 'ㄱ', 'ㅁ', 'ㅅ', 'ㅊ', and 'ㅎ', in the second index area 350. On the contrary, downscaling and displaying the first index area 250 that includes the at least one first index corresponding to the at least one first language item starting with an English letter, the controller 110 may display the representative first index that represents the first index area 250 in the first index area 250. For example, referring to FIG. 7D, the controller 110 may display 'A' as the representative first index 260 among 'A' to 'Z' indexes that correspond to the at least one first language item in the first index area 250. The controller 110 may also display the first index area 250 and the second index area 350 in the first list scroll bar 230. Thus, the controller 110 may detect the gesture to select the representative second index that represents the second index area 350 downscaled and displayed in step S110, and expand the second index area 350 again.

Furthermore, upon detecting a gesture to select the representative third index 460, the controller 110 may expand and display the third index area 450 in the first list scroll bar 230, in the same way of expanding and displaying the second index area 350 in the first list scroll bar 230.

According to the third example of the present invention, in determining whether there is a gesture to select the representative second index, the gesture may be a touch on the representative second index. Thus, detection of the touch on the representative second index may lead to expansion and display of the second index area 350.

FIGS. 8A-8D illustrate diagrams representing a fourth example, according to the exemplary embodiment of the present invention.

In a method of controlling the list scroll bar 230 according to the fourth example of the present invention, the representative second index may be the first of the sequentially arranged at least one second index. In other words, the controller 110 may display the representative second index that represents the second index area 350 in the first list scroll bar 230 when downscaling the second index area 350 for display. The representative second index 360 may be the first of the sequentially arranged at least one second index 340.

Referring to FIGS. 8A-8D, specifically, in the method of controlling the list scroll bar 230, a partial area of the list 200 and the first list scroll bar 230 are displayed in step S100.

Referring to FIG. 8A, the contacts list 200 is displayed on the touchscreen 190 of the electronic device 100. The contacts list 200 may include at least one first language item starting with a first language, such as English, at least one second language item starting with a second language, such as Korean, and at least one number or symbol item starting with a number or symbol.

The controller 110 of the electronic device 100 may display a partial area of the contacts list 200 on the touchscreen 190. In FIG. 8A, e.g., items 210 starting with a letter 'C' among the at least one first language item are displayed. C Item 1 refers to a first item among the at least one first language item starting with 'C'. The controller 110 may also display a 'C' section 220 that represents items starting with 'C' on the touchscreen 190.

The controller 110 may generate 'A' to 'Z' as the at least one first index 240 corresponding to the at least one first language item starting with an English letter and display the generated English letters on the touchscreen 190. In addition, the at least one first index 240 may be included in the first index area 250 to be displayed in the list scroll bar 230.

The contacts list 200 may also include at least one second language item starting with a second language, such as Korean, and the controller 110 may display the second index area 350 in the first list scroll bar 230 by having the second index area include the at least one second index corresponding to the at least one second language item.

The contacts list 200 may also include at least one number or symbol item starting with a number or symbol, and the controller 110 may display the third index area 450 in the first list scroll bar 230 by having the third index area 450 include the at least one third index corresponding to the at least one number or symbol item.

Next, the method of controlling the list scroll bar includes displaying the first index area 250 and the second index area 350 in the first list scroll bar 230 by expanding the first index area 250 while downscaling the second index area 350, in step S110. When expanding the first index area 250 for display, the controller 110 may display all of the at least one first index in the list scroll bar 230, or may display some of the at least one first index in the list scroll bar 230. On the other hand, the controller 110 may display the representative second index that represents the second index area 350 in the first list scroll bar 230 when downscaling the second index area 350 for display. The representative second index 360 may be the first of the sequentially arranged at least one second index 340. The controller 110 may display the representative third index that represents the third index area 450 in the first list scroll bar 230 when downscaling the third index area 450 for display.

For example, referring to FIG. 8A, expanding and displaying the first index area 250 including the at least one first index that corresponds to the at least one first language item starting with an English letter, the controller 110 may display 'A' to 'Z' corresponding to all of the at least one first index 240 in the first index area 250. Also, expanding and displaying the first index area 250, the controller 110 may display some of the at least one first index, 'A', 'F', 'M', 'U', and 'Z', in the first index area 250. On the contrary, downscaling and displaying the second index area 350 that includes the at least one second index corresponding to the at least one second language item starting with a Korean character, the controller 110 may display the representative second index that represents the second index area 350 in the second index area 350. The representative second index 360 may be the first of the sequentially arranged at least one second index 340. For example, referring to FIG. 8A, the controller 110 may display 'ㄱ' as the representative second index 360 among sequentially arranged 'ㄱ' to 'ㅎ' that correspond to the at least one second language item in the second index area 350. The controller 110 may also display the first index area 250 and the second index area 350 in the first list scroll bar 230.

Then, the method of controlling the list scroll bar 230 according to the exemplary embodiment of the present invention includes determining whether a gesture as shown in FIG. 8B to select the representative second index is detected, in step S120. The controller 110 may detect a gesture to select the representative second index 360, e.g., a touch on the representative second index 360. For example, referring to FIG. 8C, the controller 110 may detect the gesture to select the representative second index 360, e.g., the touch on the representative second index 360.

Next, the method of controlling the list scroll bar 230 includes displaying the first index area 250 and the second index area 350 in the first list scroll bar 230 by downscaling the first index area while expanding the second index area, in step S130. For example, referring to FIG. 8D, expanding and displaying the second index area 350 including the at least one second index that corresponds to the at least one second language item starting with a Korean character, the controller 110 may display 'ㄱ' to 'ㅎ' indexes corresponding to all of the at least one second index 340 in the second index area 350. The controller 110 may display the list 200 from the at least one second language item starting with the representative second index on the touchscreen 190. Also, expanding and displaying the second index area 350, the controller 110 may display some of the at least one second index, 'ㄱ', 'ㅁ', 'ㅅ', 'ㅊ', and 'ㅎ', in the second index area 350. On the contrary, downscaling and displaying the first index area 250 that includes the at least one first index corresponding to the at least one first language item starting with an English letter, the controller 110 may display the representative first index that represents the first index area 250 in the first index area 250. For example, referring to FIG. 8D, the controller 110 may display 'A' as the representative first index 260 among sequentially arranged 'A' to 'Z' indexes that correspond to the at least one first language item in the first index area 250. The controller 110 may also display the first index area 250 and the second index area 350 in the first list scroll bar 230. Thus, the controller 110 may detect the gesture to select the representative second index that represents the second index area 350 downscaled and displayed in step S110, and expand the second index area 350 again.

According to the fourth example of the present invention, while the at least one second index is sequentially arranged with the second index area 350 as the representative second index, the controller 110 may display on the touchscreen 190 the list from the at least one second language item starting with the representative second index.

FIGS. 9A-9E illustrate diagrams representing a fifth example, according to the exemplary embodiment of the present invention.

A method of controlling the list scroll bar 230 according to the fifth example of the present invention includes displaying at first at least one item corresponding to the representative second index on the touchscreen 190 if the representative second index is the first of the sequentially arranged second indexes; and displaying for the next time at least one item corresponding to the last of the sequentially arranged second indexes if a touch on a holding icon displayed on the touchscreen 190 is held for a few seconds.

On the contrary, the method of controlling the list scroll bar 230 according to the fifth example of the present invention includes initially displaying at least one item corresponding to the representative second index on the touchscreen 190 if the representative second index is the last of the sequentially arranged second indexes; and displaying for the next time at least one item corresponding to the first of the sequentially arranged second indexes if a touch on a holding icon displayed on the touchscreen 190 is held for a few seconds.

Figures 9A, 9B, 9C, 9D, 9E:
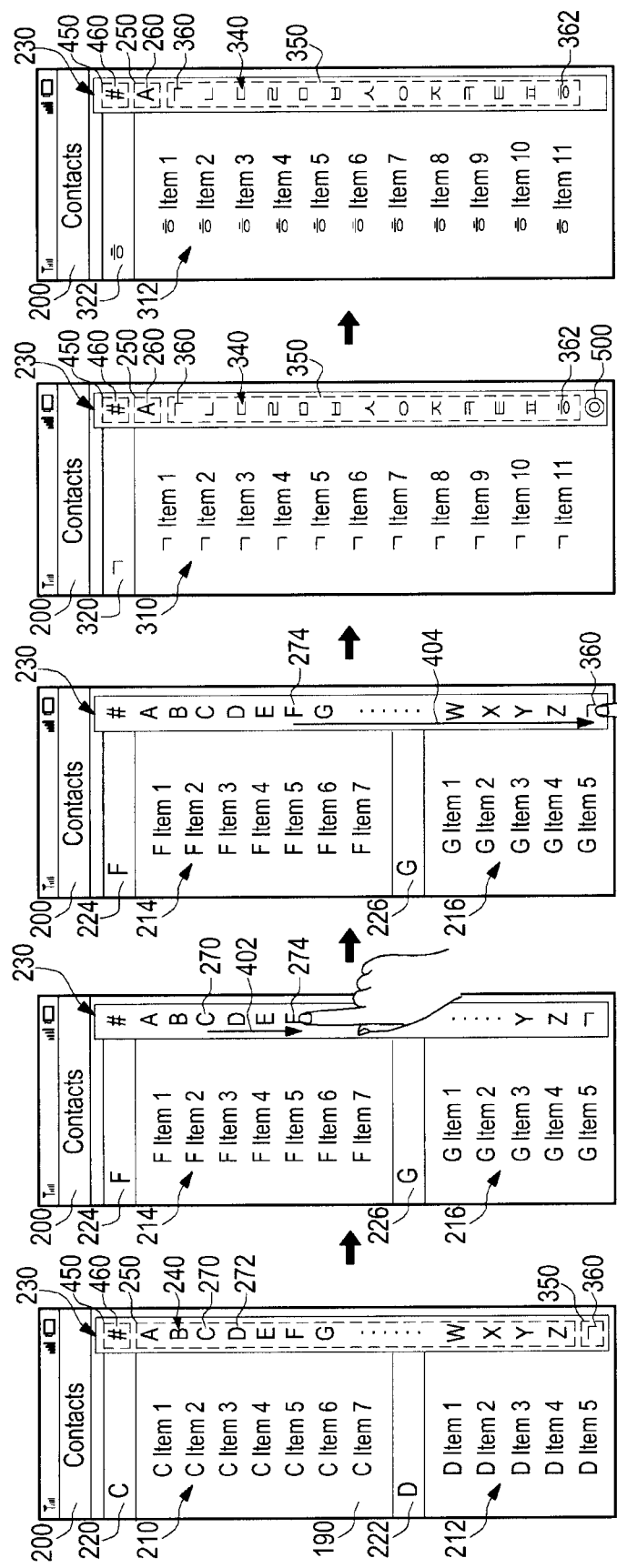
FIG. 9A, FIG. 9B, FIG. 9C, FIG. 9D and FIG. 9E illustrate diagrams representing a fifth example, according to the exemplary embodiment of the present invention.

Referring to FIGS. 9A-9E, specifically, in the method of controlling the list scroll bar 230, a partial area of the list 200 and the first list scroll bar 230 are displayed, in step S100. Referring to FIG. 9A, the contacts list 200 is displayed on the touchscreen 190 of the electronic device 100. The contacts list 200 may include at least one first language item starting with a first language, such as English, at least one second language item starting with a second language, such as Korean, and at least one number or symbol item starting with a number or symbol.

The controller 110 of the electronic device 100 may display a partial area of the contacts list 200 on the touchscreen 190. In FIG. 9A, e.g., items 210 starting with a letter 'C' among the at least one first language item are displayed. C Item 1 refers to a first item among the at least one first language item starting with 'C'. The controller 110 may also display a 'C' section 220 that represents items starting with 'C' on the touchscreen 190.

The controller 110 may generate 'A' to 'Z' as the at least one first index 240 corresponding to the at least one first language item starting with an English letter and display the generated English letters on the touchscreen 190. In addition, the at least one first index 240 may be included in the first index area 250 to be displayed in the list scroll bar 230.

The contacts list 200 may also include at least one second language item starting with a second language, such as Korean, and the controller 110 may display the second index area 350 in the first list scroll bar 230 by having the second index area 350 include the at least one second index corresponding to the at least one second language item.

The contacts list 200 may also include at least one number or symbol item starting with a number or symbol, and the controller 110 may display the third index area 450 in the first list scroll bar 230 by having the third index area 450 include the at least one third index corresponding to the at least one number or symbol item.

Next, the method of controlling the list scroll bar 230 includes displaying the first index area 250 and the second index area 350 in the first list scroll bar by expanding the first index area 250 while downscaling the second index area, in step S110. When expanding the first index area 250 for display, the controller 110 may display all of the at least one first index in the list scroll bar 230, or may display some of the at least one first index in the list scroll bar 230. On the other hand, the controller 110 may display the representative second index that represents the second index area 350 in the first list scroll bar 230 when downscaling the second index area 350 for display. The representative second index 360 may be the first of the sequentially arranged at least one second index 340. The controller 110 may display the representative third index that represents the third index area 450 in the first list scroll bar 230 when downscaling the third index area 450 for display.

For example, referring to FIG. 9A, expanding and displaying the first index area 250 including the at least one first index that corresponds to the at least one first language item starting with an English letter, the controller 110 may display 'A' to 'Z' corresponding to all of the at least one first index 240 in the first index area 250. Also, expanding and displaying the first index area 250, the controller 110 may display some of the at least one first index, 'A', 'F', 'M', 'U', and 'Z', in the first index area 250. On the contrary, downscaling and displaying the second index area 350 that includes the at least one second index corresponding to the at least one second language item starting with a Korean character, the controller 110 may display the representative second index 360 that represents the second index in the second index area 350. The representative second index 360 may be the first of the sequentially arranged at least one second index 340. For example, referring to FIG. 9A, the controller 110 may display 'ㄱ' as the representative second index 360 among sequentially arranged 'ㄱ' to 'ㅎ' that correspond to the at least one second language item in the second index area 350. The controller 110 may also display a representative third index 460 in the first scroll bar 230 on behalf of the third index area 450 by downscaling the third index area 450 including the at least one third index corresponding to the at least one number or symbol item, in the same way of downscaling the second index area 350. The controller 110 may also display the first index area 250, the second index area 350, and the third index area 450 in the first list scroll bar 230.

Then, the method of controlling the list scroll bar according to the exemplary embodiment of the present invention includes determining whether a gesture to select the representative second index is detected, in step S120. The controller 110 may detect a gesture as shown in FIG. 9B to select the representative second index 360, e.g., scrolling from the first index area 250 to the representative second index 360. For example, referring to FIG. 9C, the controller 110 may detect the gesture to select the representative second index 360, e.g., the scrolling from the first index area 250 to the representative second index 360. Furthermore, the controller 110 may detect a gesture to select the representative third index 460 in the same way of detecting the gesture to select the representative second index 360.

Next, the method of controlling the list scroll bar includes step S130 of displaying the first index area 250 and the second index area 350 in the first list scroll bar 230 by downscaling the first index area 250 while expanding the second index area 350. For example, referring to FIG. 9D, expanding and displaying the second index area 350 including the at least one second index that corresponds to the at least one second language item starting with a Korean character, the controller 110 may display 'ㄱ' to 'ㅎ' corresponding to all of the at least one second index 340 in the second index area 350. The controller 110 may display the list 200 from the at least one second language item starting with the representative second index 360, 'ㄱ' on the touchscreen 190. In this case, the controller 110 may display the holding icon 500 in a position of the touchscreen 190 where there was the representative second index 360 before expansion of the second index area, as shown in FIG. 9D. If a touch on the holding icon 500 is held for a predetermined duration of time, such as a few seconds, then the controller 110 may display for the next time at least one item corresponding to the last of the sequentially arranged second indexes. In other words, for example, as shown in FIG. 9E, the controller 110 may display the at least one second language item, ㅎ Item 1 to 10, corresponding to the last index 'ㅎ' among the sequentially arranged second indexes, 'ㄱ' to 'ㅎ'. Thus, by pressing the holding icon 500, the at least one item corresponding to the last of the sequentially arranged second indexes, such as the items 312, are set and held to be displayed.

Furthermore, the controller 110 may expand and display the third index area 450 in the first list scroll bar 230, in the same way of expanding and displaying the second index area 350 in the first list scroll bar 230.

Thus, according to the fifth example of the present invention, when expanding a downscaled index area including the holding icon 500, the controller 110 may rearrange the list, which has been arranged from the first index, from the last index when a touch on the holding icon 500 is held for the predetermined duration of time. That is, according to the fifth example of the present invention, in case of expanding a downscaled index area, the holding icon 500 is advantageously used to select the list to be scrolled from the first index or the last index.

Figure 10:
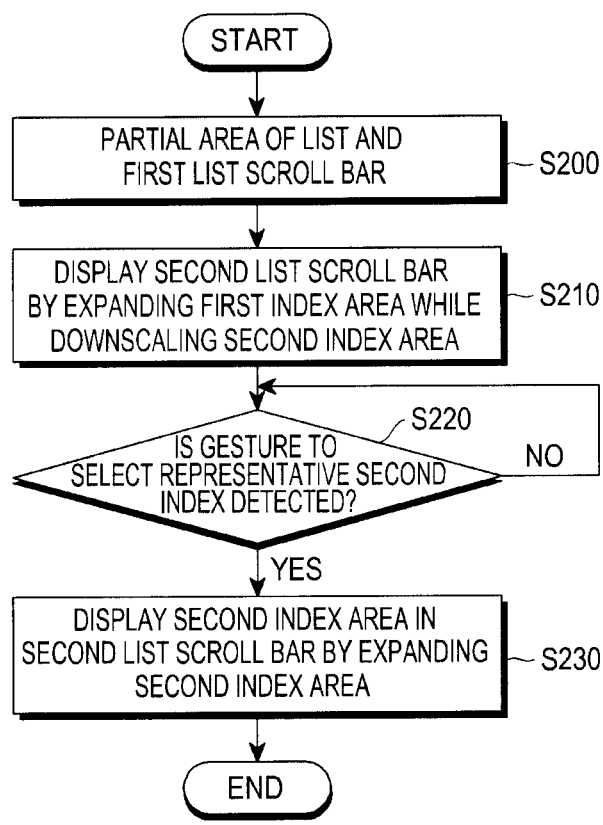
FIG. 10 is a flowchart, according to an alternative exemplary embodiment of the present invention.

FIG. 10 is a flowchart, according to an alternative exemplary embodiment of the present invention. FIGS. 11A-11D illustrate diagrams representing a method of controlling a list scroll bar 230, according to the alternative exemplary embodiment of the present invention.

Figures 11A, 11B, 11C, 11D:
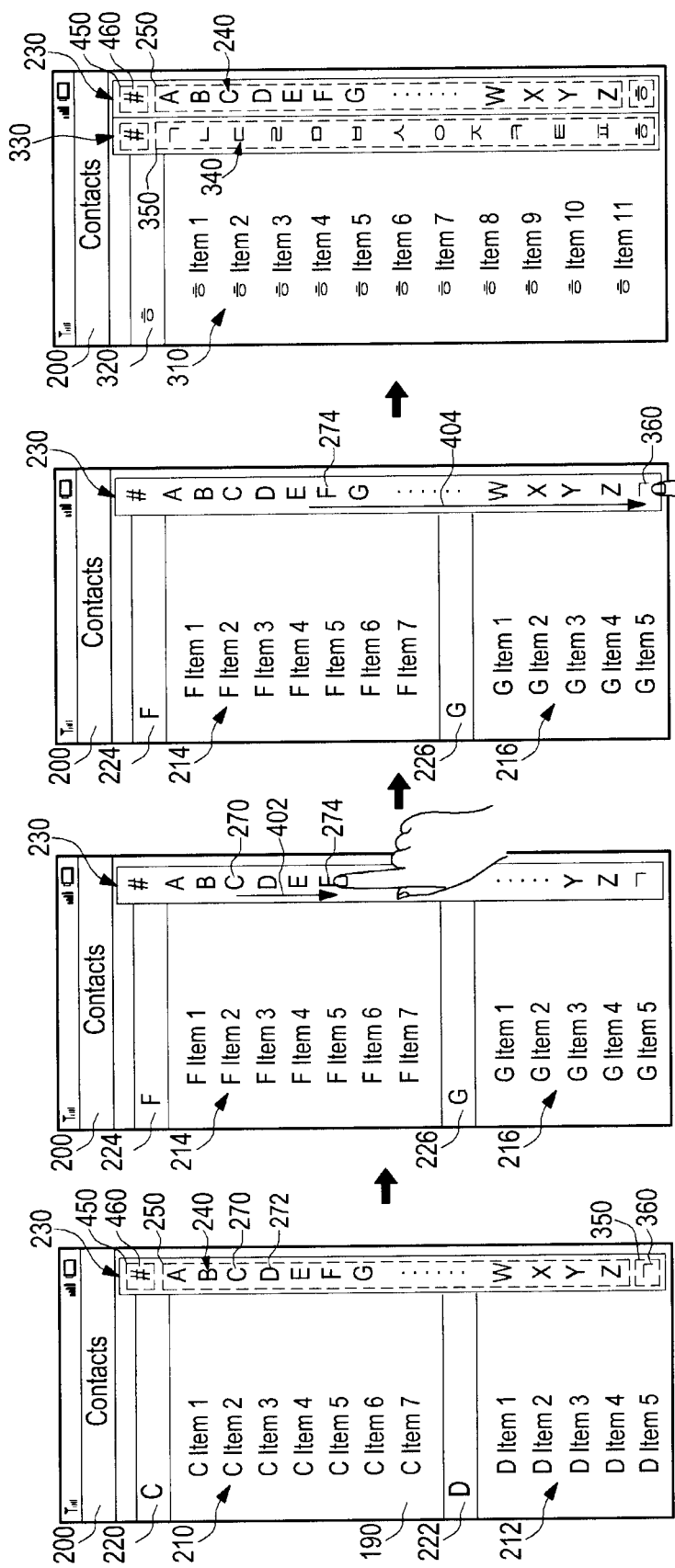
FIG. 11A, FIG. 11B, FIG. 11C, and FIG. 11D illustrate diagrams representing a method of controlling a list scroll bar, according to the alternative exemplary embodiment of the present invention.

Referring both FIGS. 10 and 11A-11D, first, the method of controlling the list scroll bar 230 has displaying a partial area of a list and a first list scroll bar 230, in step S200. The controller 110 of the electronic device 100 may display a partial area of the contacts list 200 on the touchscreen 190. In FIG. 11A, e.g., items 210 starting with a letter 'C' among the at least one first language item are displayed. C Item 1 refers to a first item among the at least one first language item starting with 'C'. The controller 110 may also display a 'C' section 220 that represents items starting with 'C' on the touchscreen 190.

The controller 110 may generate 'A' to 'Z' as the at least one first index 240 corresponding to the at least one first language item starting with an English letter and display the generated English letters on the touchscreen 190. In addition, the at least one first index 240 may be included in the first index area 250 to be displayed in the list scroll bar 230.

The contacts list 200 may also include at least one second language item starting with a second language, such as Korean, and the controller 110 may display the second index area 350 in the first list scroll bar 230 by having the second index area 350 include the at least one second index corresponding to the at least one second language item.

The contacts list 200 may also include at least one number or symbol item starting with a number or symbol, and the controller 110 may display the third index area 450 in the first list scroll bar 230 by having the third index area 450 include the at least one third index corresponding to the at least one number or symbol item.

Next, the method of controlling the list scroll bar to display a second list scroll bar 330 includes displaying the first index area 250 and the second index area 350 in the first list scroll bar 230 by expanding the first index area 250 while downscaling the second index area 350, in step S210. When expanding the first index area 250 for display, the controller 110 may display all of the at least one first index in the first list scroll bar 230, or may display some of the at least one first index in the first list scroll bar 230. On the other hand, the controller 110 may display the representative second index that represents the second index area 350 in the first list scroll bar 230 when downscaling the second index area 350 for display. The controller 110 may downscale and display the third index area 450 for the number or symbol items in the same way of downscaling and displaying the second index area 350.

For example, referring to FIG. 11A, expanding and displaying the first index area 250 including the at least one first index that corresponds to the at least one first language item starting with an English letter, the controller 110 may display 'A' to 'Z' corresponding to all of the at least one first index 240 in the first index area 250. Also, expanding and displaying the first index area 250, the controller 110 may display some of the at least one first index, 'A', 'F', 'M', 'U', and 'Z', in the first index area 250. On the contrary, downscaling and displaying the second index area 350 that includes the at least one second index corresponding to the at least one second language item starting with a Korean character, the controller 110 may display the representative second index 360 that represents the second index in the second index area 350. For example, referring to FIG. 11A, the controller 110 may display 'ㅎ' as the representative second index 360 among 'ㄱ' to 'ㅎ' indexes that correspond to the at least one second language item in the second index area 350. On the contrary, downscaling and displaying the third index area 450 that includes the at least one third index corresponding to the at least one number or symbol item starting with a number or symbol, the controller 110 may display the representative third index 460 that represents the third index in the third index area 450. The controller 110 may also display the first index area 250 and the second index area 350 in the first list scroll bar 230.

Then, the method of controlling the list scroll bar according to the alternative exemplary embodiment of the present invention includes determining whether a gesture as shown in FIG. 11B to select the representative second index 360 is detected in step S220. If no gesture is detected in step S220, the method loops back to repeat step S220 until a gesture is detected. Once a gesture is detected, the method proceeds to step S230. The controller 110 may detect a gesture to select the representative second index 360, e.g., scrolling from the first index area 250 to the representative second index 360. For example, referring to FIG. 11C, the controller 110 may detect the gesture to select the representative second index 360, e.g., the scrolling from the first index area 250 to the representative second index 360. Furthermore, the controller 110 may detect a gesture to select the representative third index 460 in the same way of detecting the gesture to select the representative second index 360.

Next, the method of controlling the list scroll bar includes displaying the second index area 350 in the second list scroll bar 330 by expanding the second index area 350, in step S230. For example, referring to FIG. 11D, expanding and displaying the second index area 350 including the at least one second index that corresponds to the at least one second language item starting with a Korean character, the controller 110 may display 'ㄱ' to 'ㅎ' indexes corresponding to all of the at least one second index 340 in the second list scroll bar 330 by including the displayed indexes in the second index area 350. In other words, the controller 110 may display the expanded second index area in the second list scroll bar 330, different from the first list scroll bar 230. Furthermore, the controller 110 may expand and display the third index area 450 in the second list scroll bar 330, in the same way of expanding and displaying the second index area 350 in the first list scroll bar 230.

Thus, the method according to the alternative exemplary embodiment of the present invention facilitates scrolling of the plurality of language items, symbol items, or number items displayed on a plurality of list scroll bars 230, 330 by providing the plurality of list scroll bars 230, 330.

FIGS. 12A-12E illustrate diagrams representing a sixth example, according to the exemplary embodiment of the present invention.

According to a method of controlling the list scroll bar according to the sixth example of the present invention, the list may be scrolled by displaying the plurality of list scroll bars 230, 330 on the touchscreen 190.

Figures 12A, 12B, 12C, 12D, 12E:
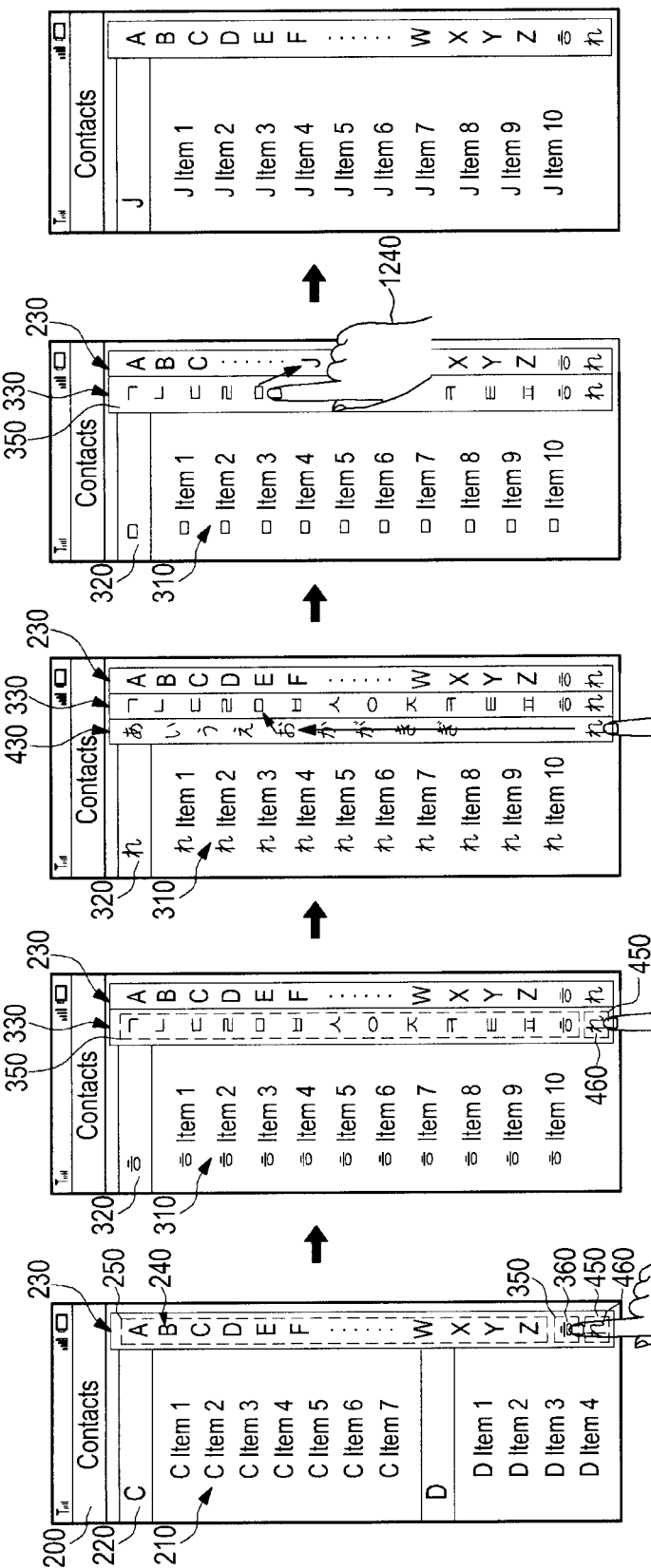
FIG. 12A, FIG. 12B, FIG. 12C, FIG. 12D and FIG. 12E illustrate diagrams representing a sixth example, according to the exemplary embodiment of the present invention.

Referring FIG. 12A, first, the method of controlling the list scroll bar includes displaying a partial area of a list and a first list scroll bar 230, in step S200. The controller 110 of the electronic device 100 may display a partial area of the contacts list 200 on the touchscreen 190. In (FIG. 12A, e.g., items 210 starting with a letter 'C' among the at least one first language item are displayed. C Item 1 refers to a first item among the at least one first language item starting with 'C'. The controller 110 may also display a 'C' section 220 that represents items starting with 'C' on the touchscreen 190.

The controller 110 may generate 'A' to 'Z' as the at least one first index 240 corresponding to the at least one first language item starting with an English letter and display the generated English letters on the touchscreen 190. In addition, the at least one first index 240 may be included in the first index area 250 to be displayed in the first list scroll bar 230.

The contacts list 200 may also include at least one second language item starting with a second language, such as Korean, and the controller 110 may display the second index area 350 in the first list scroll bar 230 by having the second index area include the at least one second index corresponding to the at least one second language item.

The contacts list 200 may also include at least one third language item starting with a third language, such as Japanese, and the controller 110 may display the third index area 450 in the first list scroll bar 230 by having the third index area 450 include the at least one third index corresponding to the at least one third language item.

Next, the method of controlling the list scroll bar includes displaying the index areas 250, 350, 450 in the first list scroll bar 250 by expanding the first index area 250 while downscaling the second index area 350 and the third index area 450, in step S210. When expanding the first index area 250 for display, the controller 110 may display all of the at least one first index in the first list scroll bar 230, or may display some of the at least one first index in the first list scroll bar 230. On the other hand, the controller 110 may display the representative second index 360 that represents the second index area 350 in the first list scroll bar 230 when downscaling the second index area 350 for display. Downscaling the third index area 450 for display, the controller 110 may display the representative third index that represents the third index area 450 in the first list scroll bar 230.

For example, referring to FIG. 12A, expanding and displaying the first index area 250 including the at least one first index that corresponds to the at least one first language item starting with an English letter, the controller 110 may display 'A' to 'Z' corresponding to all of the at least one first index 240 in the first index area 250. Also, when expanding and displaying the first index area 250, the controller 110 may display some of the at least one first index, 'A', 'F', 'M', 'U', and 'Z', in the first index area 250. On the contrary, when downscaling the second index area 350 that includes the at least one second index corresponding to the at least one second language item starting with a Korean character, the controller 110 may display the representative second index that represents the second index area 350 in the second index area 350. For example, referring to FIG. 12A, the controller 110 may display 'ㅎ' as the representative second index 360 among 'ㄱ' to 'ㅎ' indexes that correspond to the at least one second language item in the second index area 350.

On the contrary, when downscaling the third index area 450 that includes the at least one third index corresponding to the at least third language item starting with a Japanese character, the controller 110 may display the representative third index 460 that represents the third index in the third index area 450. For example, referring to FIG. 12A, the controller 110 may display 'わ' as the representative third index 460 among the at least one third index, 'あ' to 'わ', that correspond to the at least one third language item in the third index area 450. The controller 110 may also display the first index area 250, the second index area 350, and the third index area 450 in the first list scroll bar 230.

Then, the method of controlling the list scroll bar according to the alternative exemplary embodiment of the present invention includes determining whether a gesture to select the representative second index is detected, in step S220. The controller 110 may detect a gesture to select the representative second index 360, e.g., scrolling from the first index area 250 to the representative second index 360. For example, referring to FIG. 12B, the controller 110 may detect the gesture to select the representative second index 360, e.g., the scrolling 1210 from the first index area 250 to the representative second index 360.

Next, the method of controlling the list scroll bar includes displaying the second index area 350 in the second list scroll bar 330 by expanding the second index area 350, in step S230. For example, referring to FIG. 12B, when expanding and displaying the second index area 350 including the at least one second index that corresponds to the at least one second language item starting with a Korean character, the controller 110 may display 'ㄱ' to 'ㅎ' indexes corresponding to all of the at least one second index 340 in the second list scroll bar 330 by including the displayed Korean indexes in the second index area 350. In other words, the controller 110 may display the expanded second index area 350 in the second list scroll bar 330, different from the first list scroll bar 230.

Then, the method of controlling the list scroll bar according to the alternative exemplary embodiment of the present invention includes determining whether a gesture to select the representative third index is detected, in step S240. The controller 110 may detect a gesture to select the representative third index 460, e.g., scrolling from the second index area 350 to the representative third index 460. For example, referring to FIG. 12B, the controller 110 may detect the gesture to select the representative third index 460, e.g., the scrolling 1220 from the second index area 350 to the representative third index 460.

Next, the method of controlling the list scroll bar includes displaying the third index area 450 in the third list scroll bar by expanding the third index area 450, in step S250. For example, referring to FIG. 12C, when expanding and displaying the third index area 450 including the at least one third index that corresponds to the at least one third language item starting with a Japanese character, the controller 110 may display 'あ' to 'わ' indexes corresponding to all of the at least one third index 440 in the third list scroll bar 430 by including the displayed indexes in the third index area 450. In other words, the controller 110 may display the expanded third index area 460 in the third list scroll bar 430, different from the list scroll bars 230 and 330. Furthermore, the controller 110 may detect scrolling for the third index area 460 and accordingly scroll the list 200. Specifically, as shown in FIG. 12C, detecting scrolling of the third index area 460 e.g., the scrolling 1230 from 'あ' to 'わ', the controller 110 may scroll the list 200.

Upon detecting the scrolling from the third list scroll bar 430 to the second list scroll bar 330 in FIG. 12C, the controller 110 may eliminate the third list scroll bar 430 from the touchscreen 190. Specifically, as shown in FIG. 12C, when detecting scrolling from the third list scroll bar 430 to the second list scroll bar 330, e.g., the scrolling from an index 'あ' included in the third list scroll bar 430 to an index 'ㅁ' included in the second list scroll bar 330, the controller 110 may eliminate the third list scroll bar 430 from the touchscreen 190, as shown in FIG. 12D.

Upon detecting the scrolling 1240 from the second list scroll bar 330 to the first list scroll bar 230 in FIG. 12D, the controller 110 may eliminate the second list scroll bar 330 from the touchscreen 190. Specifically, as shown in FIG. 12D, detecting scrolling from the second list scroll bar 330 to the first list scroll bar 230, e.g., the scrolling from an index 'ㅁ' included in the second list scroll bar 330 to an index 'J' included in the first list scroll bar 230, the controller 110 may eliminate the second list scroll bar 330 from the touchscreen 190, as shown in FIG. 12E. Thus, the method according to the sixth example of the present invention facilitates scrolling across the plurality of language items, symbol items, or number items displayed on a plurality of list scroll bars 230, 330 by providing the plurality of list scroll bars 230, 330. Furthermore, the method according to the sixth example of the present invention may eliminate the second list scroll bar 330 from the touchscreen 190 by detecting the scrolling from the second list scroll bar 330 to the first list scroll bar 230.

FIGS. 13A-13D illustrate diagrams representing a method of controlling the list scroll bar 230, according to the alternative exemplary embodiment of the present invention.

The method includes expanding and displaying the second index area 350 in the first list scroll bar 230 if the scrolling of the list leads to a change from a first item to a second item among the at least one item displayed on the touchscreen 190, and downscaling the first index area 250 and displaying the representative first index 260 that represents the first index area 250 in the first list scroll bar 230.

In FIG. 13A, the touchscreen 190 shows that a contacts application is running in the electronic device 100. The contacts application includes a contacts list 200. The contacts list 200 may include at least one item 210. The at least one item 210 may be at least one contact stored in the electronic device 100. The at least one contact may be formed of at least one of characters, numbers, and symbols.

At least one first item may be at least one first language item starting with a first language, such as English. At least one second item may be at least one second language item starting with a second language, such as Korean. At least one third item may be at least one number or symbol item starting with a number or symbol. The contacts list 200 may include the at least one first language item, the at least one second language item, or the at least one number or symbol item. The at least one first language item in the first language, such as English, may start with any of 'A' to 'Z', the at least one second language item in the second language, such as Korean, may start with any of 'ㄱ' to 'ㅎ', and the at least one number or symbol item consisting of numbers or symbols may start with any of '1' to '#'.

In FIG. 13A, items 210 including C Items 1 to 7 starting with 'C' and items 212 including D items 1 to 4 starting with 'D', among the at least one first language item starting with any of 'A' to 'Z', are displayed on the touchscreen 190. C Item 1 refers to a first item among the sequentially arranged at least one item starting with 'C'. C Item 1 to 7 refer to first to seventh items among the at least one first language item starting with 'c' sequentially arranged in alphabetical order. In FIG. 13A, C Items 1 to 7 and D Items 1 to 4 among the first language items of the contact list 200 are sequentially arranged and displayed in the alphabetical order on the touchscreen 190. However, not all items included in the contacts list may be displayed on the touchscreen 190 and so, only a partial area of the contacts list including C Item 1 to 7 and D Item 1 to 4 among the first language items of the contacts list 200 is displayed on the touchscreen 190 of FIG. 13A. The contacts list 200 may also include the at least one second language item starting with the second language and the at least one number or symbol item starting with a number or symbol, but, due to the limit of screen size, the at least one second language item and the at least one number or symbol item are not displayed on the touchscreen 190 in FIG. 13A.

The controller 110 may generate and display the at least one index corresponding to the at least one item on the touchscreen 190. Since the at least one first language item starts with an English letter, the controller 110 may generate 'A' to 'Z' as the at least one first index corresponding to the at least one first language item. The controller 110 may display the at least one first index 240 on the touchscreen 190, as shown in FIG. 13A. In this regard, the at least one first index 240 may be included in the first index area 250 to be displayed in the list scroll bar 230.

Since the at least one second language item starts with a Korean character, the controller 110 may generate 'ㄱ' to 'ㅎ' as the at least one second index corresponding to the at least one second language item. The controller 110 may display the at least one second index on the touchscreen 190, as shown in FIG. 13A. In this regard, the at least one second index 360 may be included in the second index area 350 to be displayed in the list scroll bar 230.

Since the at least one number or symbol item starts with a number or symbol, the controller 110 may generate '1' to '#' as the at least one third index 460 corresponding to the at least one number or symbol item. The controller 110 may display the at least one third index 460 on the touchscreen 190, as shown in FIG. 13A. In this regard, the at least one third index 460 may be included in the third index area 450 to be displayed in the list scroll bar 230.

The controller 110 may detect the scrolling of the first index items and accordingly scroll the list 200. Specifically, the controller 110 may detect scrolling 1300 across a screen area where the first language items are displayed, and accordingly may scroll the list 200. That is, as shown in FIG. 13A, upon detecting up scrolling 1300 across a screen area where the C Items 1 to 7 are displayed, the controller 110 may scroll the list 200 upward, as shown in FIG. 13B.

Meanwhile, if the at least one first item displayed on the touchscreen 190 is changed to the at least one second item by scrolling the list, the controller 110 may expand and display the second index area 350 in the first list scroll bar 230 while downscaling the first index area 250 and displaying the representative first index in the first list scroll bar 230.

Furthermore, if the at least one first item of the at least one item displayed on the touchscreen 190 is changed to the at least one third item by scrolling the list, the controller 110 may expand and display the third index area 450 in the first list scroll bar 230 while downscaling the first index area 250 and displaying the representative first index in the first list scroll bar 230.

In FIG. 13A, if the at least one first language item displayed on the touchscreen 190 is changed to the at least one second language item by scrolling the list, the controller 110 may expand and display the second index area 350 in the first list scroll bar 230 while downscaling the first index area 250 and displaying the representative first index in the first list scroll bar 230.

Specifically, due to the scrolling 1310 of the list, if the at least one first language item e.g., 214 and 216 starting with 'F', displayed on the touchscreen 190, as in FIG. 13C, is changed to the at least one second language item 310, as shown in FIG. 13D, the controller 110 may expand and display the second index area 350 in the first scroll bar 230 while downscaling the first index area 250 and displaying the representative first index 260 that represents the first index area 250 in the first list scroll bar 230. That is, as in FIG. 13D, the controller 110 may expand the second index area 350 corresponding to the second language items starting with a Korean character and display 'ㄱ' to 'ㅎ' indexes in the first list scroll bar 230, while downscaling the first index area 250 corresponding to the first language items starting with an English letter and displaying the representative first index 260, 'A', that represents the first index area 250 in the first list scroll bar 230.

Thus, according to the alternative exemplary embodiment of the present invention, scrolling of the list causes a change of index areas 250, 350, 450 to be expanded or downscaled. This facilitates finer scrolling of items displayed on the touchscreen 190 by expanding an index area that corresponds to items displayed on the touchscreen 190 by the list scrolling.

Figures 14A, 14B, 14C:
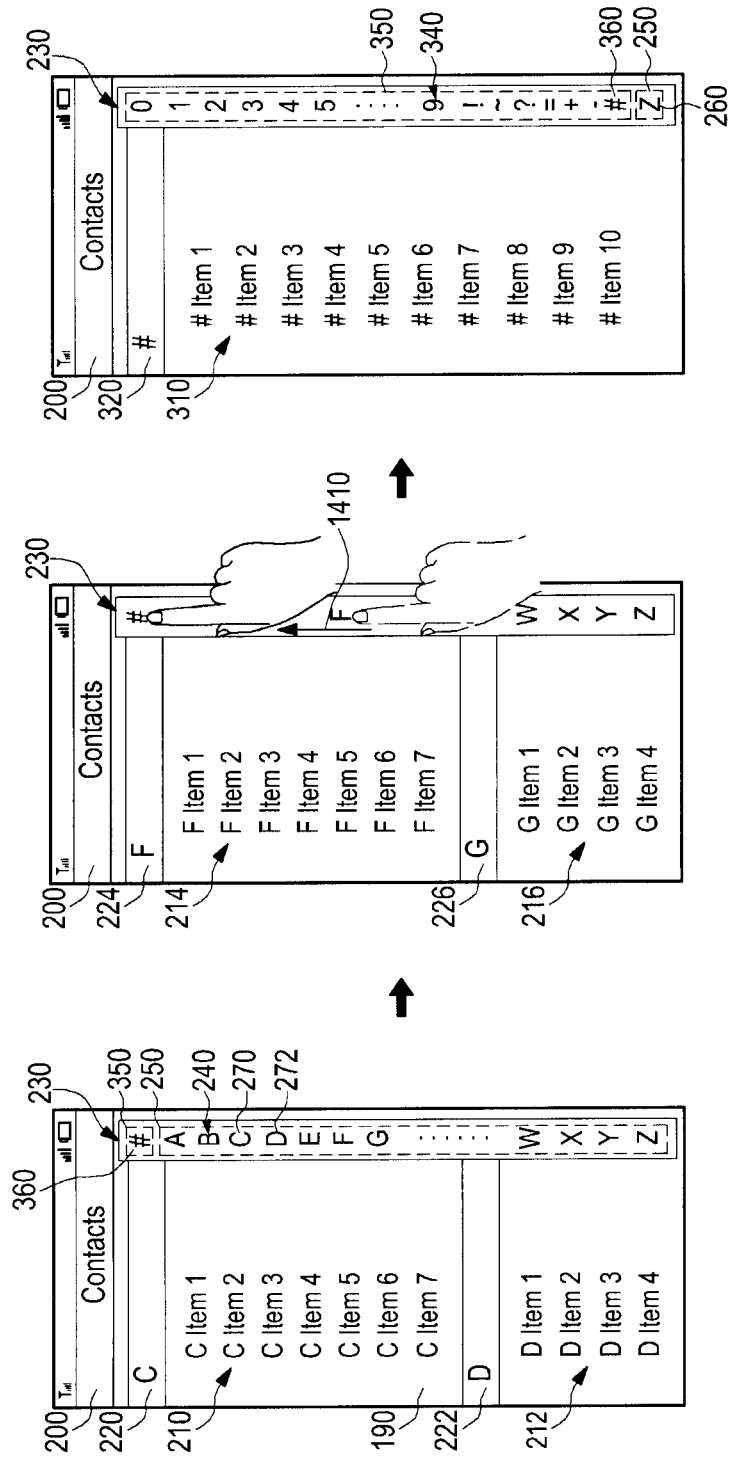
FIG. 14A, FIG. 14B and FIG. 14C illustrate diagrams representing a seventh example, according to the exemplary embodiment of the present invention.

FIGS. 14A-14C illustrate diagrams representing a seventh example, according to the exemplary embodiment of the present invention.

The method of controlling the list scroll bar 230 according to the seventh example of the present invention may include scrolling the list by displaying first indexes corresponding to first language items starting with the first language and number of symbol indexes corresponding to number or symbol items starting with a number or symbol in the first list scroll bar 230.

Referring to FIGS. 4 and 14A-14C, specifically, in the method of controlling the list scroll bar 230, a partial area of the list 200 and the first list scroll bar 230 are displayed, in step S100. Referring to FIG. 14A, the contacts list 200 is displayed on the touchscreen 190 of the electronic device 100. The contacts list 200 may include at least one first language item starting with the first language, such as English, and at least one number or symbol item starting with a number or symbol.

The controller 110 of the electronic device 100 may display a partial area of the contacts list 200 on the touchscreen 190. In FIG. 14A, e.g., items 210 starting with a letter 'C' among the at least one first language item are displayed. C Item 1 refers to a first item among the at least one first language item starting with 'C'. The controller 110 may also display a 'C' section 220 indicating that items starting with 'C' are on the touchscreen 190.

The controller 110 may generate 'A' to 'Z' as the at least one first index 240 corresponding to the at least one first language item starting with an English letter and display the generated English letters on the touchscreen 190. In addition, the at least one first index 240 may be included in the first index area 250 to be displayed in the list scroll bar 230.

The contacts list 200 may also include at least one number or symbol item starting with a number or symbol, and the controller 110 may display the second index area 350 in the first list scroll bar 230 by having the second index area 350 include the at least one second index corresponding to the at least one number or symbol item.

Next, the method of controlling the list scroll bar 230 includes displaying the first and second index areas 250 and 350 in the first list scroll bar 230 by expanding the first index area 250 while downscaling the second index area 350, in step S110. When expanding the first index area for display, the controller 110 may display all of the at least one first index in the list scroll bar 230, or may display some of the at least one first index in the list scroll bar 230. On the other hand, the controller 110 may display the representative second index that represents the second index area 350 in the first list scroll bar 230 when downscaling the second index area 350 for display.

For example, referring to FIG. 14A, when expanding and displaying the first index area 250 including the at least one first index that corresponds to the at least one first language item starting with an English letter, the controller 110 may display 'A' to 'Z' corresponding to all of the at least one first index 240 in the first index area 250. Also, when expanding and displaying the first index area 250, the controller 110 may display some of the at least one first index, 'A', 'F', 'M', 'U', and 'Z', in the first index area 250. On the contrary, when downscaling and displaying the second index area 350 that includes the at least one second index corresponding to the at least one number or symbol item starting with a number or symbol, the controller 110 may display the representative second index that represents the second index area 350 in the second index area 350. For example, referring to FIG. 14A, the controller 110 may display '#' as the representative second index 360 among '0' to '#' indexes that correspond to the at least one number or symbol item in the second index area 350. The controller 110 may also display the first index area 250 and the second index area 350 in the first list scroll bar 230.

Then, the method of controlling the list scroll bar 230 according to the exemplary embodiment of the present invention includes determining whether the gesture to select the representative second index 360 is detected, in step S120. The controller 110 may detect the gesture to select the representative second index 360, e.g., the scrolling from the first index area 250 to the representative second index 360. For example, referring to FIG. 14B, the controller 110 may detect the gesture to select the representative second index 360, e.g., the scrolling 1410 from the first index area 250 to the representative second index 360.

Next, the method of controlling the list scroll bar 230 includes displaying the first index area 250 and the second index area 350 in the first list scroll bar 230 by downscaling the first index area 250 while expanding the second index area 350, in step 130. For example, referring to FIG. 14C, when expanding and displaying the second index area 350 including the at least one second index that corresponds to the at least one number or symbol item starting with a number of symbol, the controller 110 may display '0' to '#' corresponding to all of the at least one second index 340 in the second index area 350. Also, expanding and displaying the second index area 350, the controller 110 may display some of the at least one second index, '0', '3', '9', '!', and '#', in the second index area 350. On the contrary, when downscaling the first index area 250 that includes the at least one first index corresponding to the at least one first language item starting with an English letter, the controller 110 may display the representative first index that represents the first index area 250 in the first index area 250. For example, referring to FIG. 14C, the controller 110 may display 'Z' as the representative first index 260 among 'A' to 'Z' indexes that correspond to the at least one first language item in the first index area 250. The controller 110 may also display the first index area 250 and the second index area 350 in the first list scroll bar 230. Thus, the controller 110 may detect the gesture to select the representative second index that represents the second index area 350 downscaled and displayed in step S110, and expand the second index area 350 again. According to the seventh example of the present invention, even the list including items starting with a number or symbol may be scrolled by using indexes corresponding to the items.

Figure 15:
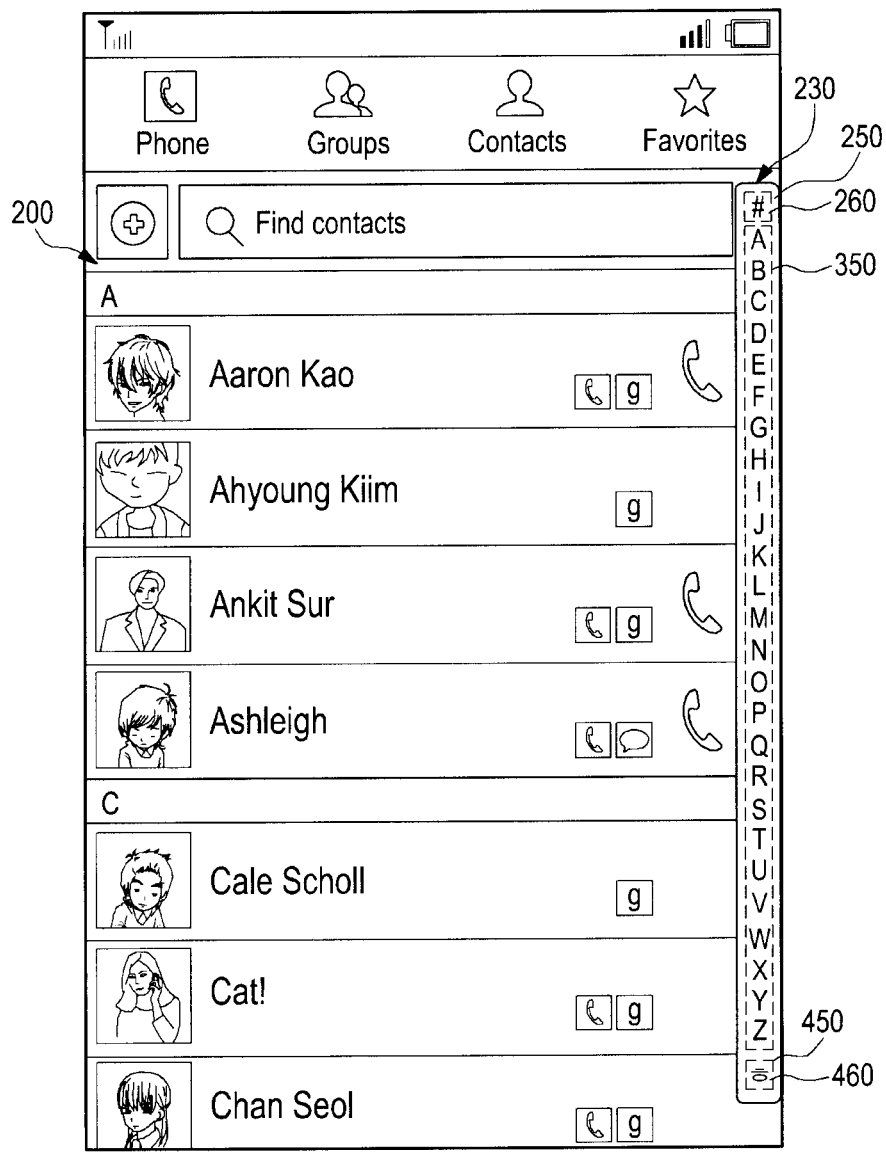
FIG. 15 illustrates a diagram representing an eighth example, according to the exemplary embodiment of the present invention.

FIG. 15 illustrates a diagram representing an eighth example, according to the exemplary embodiment of the present invention.

In the eighth example, a contacts application is running. The contacts application includes a contacts list 200 having contact items. The contacts list 200 may include at least one number or symbol item starting with a number or symbol, at least one first language item starting with a first language, such as English, and at least one second language item starting with a second language, such as Korean. The controller 110 may generate first indexes corresponding to the number or symbol items, second indexes corresponding to the second language items, and third indexes corresponding to the third language items. The controller 110 may also display the first index area 250 having the first indexes, the second index area 350 having the second indexes, and the third index area 450 having the third indexes in the first list scroll bar 230. The controller 110 may also downscale and display the index areas 250, 350, and 450 in the first list scroll bar 230. Furthermore, the controller 110 may detect scrolling across the index areas 250, 350, 450 and scroll the list 200 accordingly. Thus, according to the eighth example of the present invention, the first list scroll bar 230 including the index areas 250, 350, and 450 may be advantageously used to scroll the contacts list 200 included in the contacts application.

Figure 16:
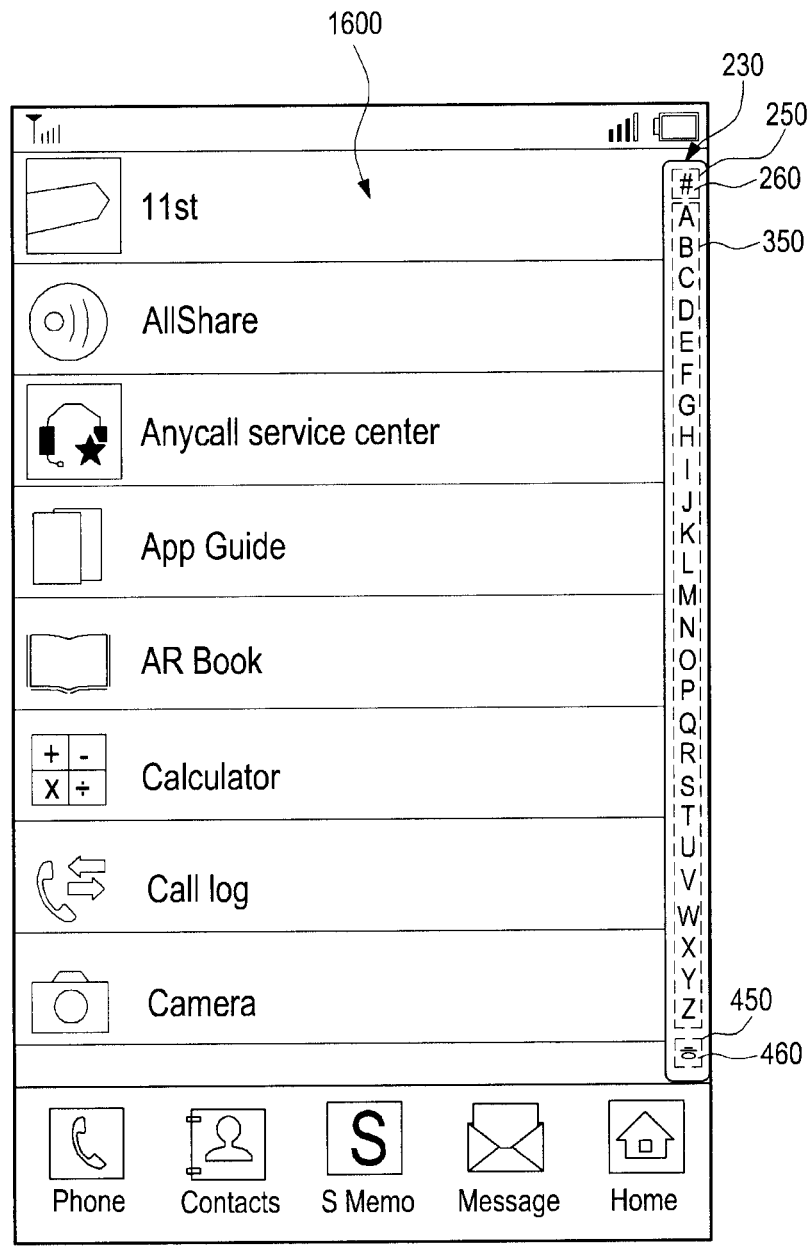
FIG. 16 illustrates a diagram representing a ninth example, according to the exemplary embodiment of the present invention.

FIG. 16 illustrates a diagram representing a ninth example, according to the exemplary embodiment of the present invention.

In the ninth example, an applications window is opened. The applications window includes an applications list 1600 having application items. The applications list 1600 may include at least one number or symbol item starting with a number or symbol, at least one first language item starting with a first language, such as English, and at least one second language item starting with a second language, such as Korean. The controller 110 may generate first indexes corresponding to the number or symbol items, second indexes corresponding to the second language items, and third indexes corresponding to the third language items. The controller 110 may also display the first index area 250 having the first indexes, the second index area 350 having the second indexes, and the third index area 450 having the third indexes in the first list scroll bar 230. The controller 110 may also downscale and display the index areas 250, 350, and 450 in the first list scroll bar 230. Furthermore, the controller 110 may detect scrolling for the index areas 250, 350, 450 and scroll the list 1600 accordingly. Thus, according to the ninth example of the present invention, the first list scroll bar 230 including the index areas 250, 350, and 450 may be advantageously used to scroll the applications list 1600 included in the applications window.

Figure 17:
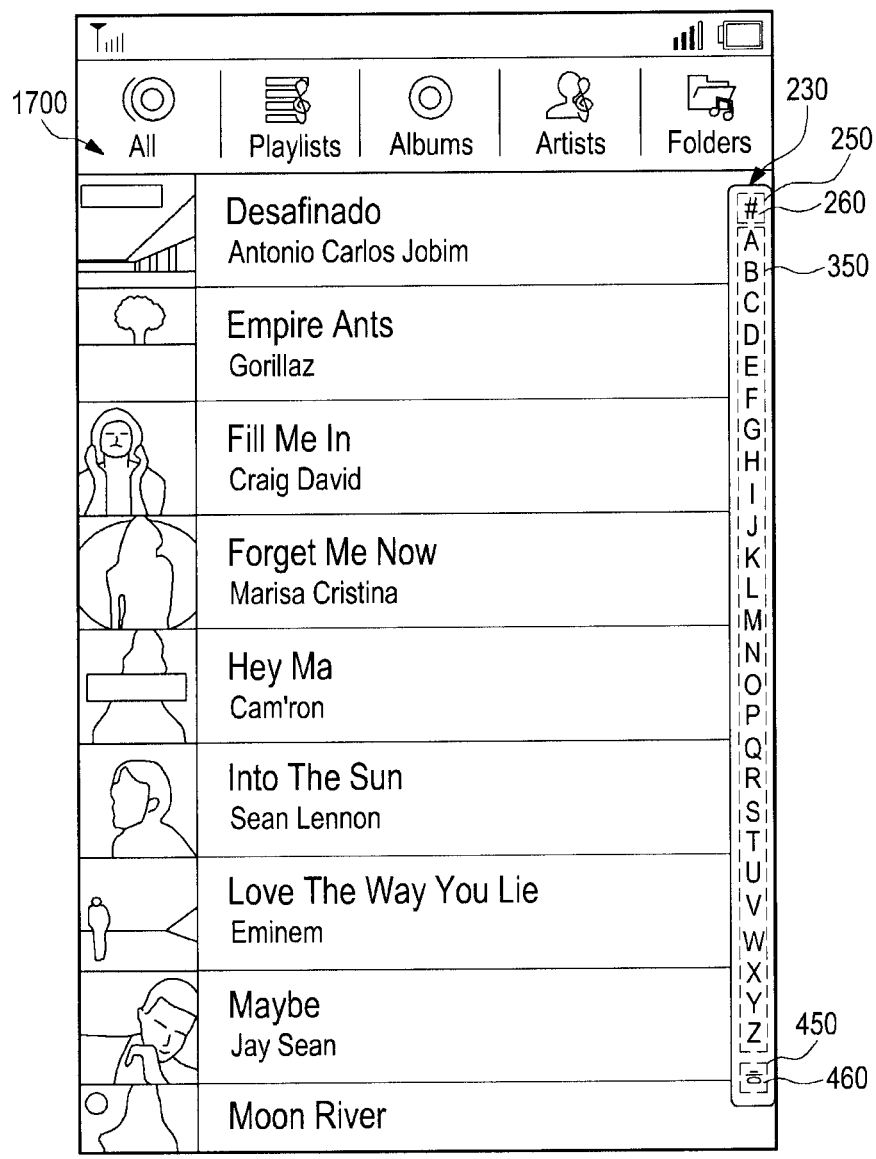
FIG. 17 illustrates a diagram representing a tenth example, according to the exemplary embodiment of the present invention.

FIG. 17 illustrates a diagram representing a tenth example, according to the exemplary embodiment of the present invention.

In the tenth example, a music application is running. The music application includes a music list 1700 having music items. The music list 1700 may include at least one number or symbol item starting with a number or symbol, at least one first language item starting with a first language, such as English, and at least one second language item starting with a second language, such as Korean. The controller 110 may generate first indexes corresponding to the number or symbol items, second indexes corresponding to the second language items, and third indexes corresponding to the third language items. The controller 110 may also display the first index area 250 having the first indexes, the second index area 350 having the second indexes, and the third index area 450 having the third indexes in the first list scroll bar 230. The controller 110 may also downscale and display the index areas 250, 350, and 450 in the first list scroll bar 230. Furthermore, the controller 110 may detect scrolling across the first to third index areas and scroll the music list 1700 accordingly. Thus, according to the tenth example of the present invention, the first list scroll bar 230 including the index areas 250, 350, and 450 may be advantageously used to scroll the music list 1700 included in the music application.

It will be appreciated that the exemplary embodiments of the present invention may be implemented in a form of hardware, software, or a combination of hardware and software. The software may be stored as program instructions or computer readable codes executable on the processor on a computer-readable medium. Examples of the computer readable recording medium include magnetic storage media (e.g., ROM, floppy disks, hard disks, etc.), and optical recording media (e.g., CD-ROMs, or DVDs). The computer readable recording medium can also be distributed over network coupled computer systems so that the computer readable code is stored and executed in a distributed fashion. This media can be read by the computer, stored in the memory, and executed by the processor. The memory included in the power transmitter or the power receiver may be an example of the computer readable recording medium suitable for storing a program or programs having instructions that implement the exemplary embodiments of the present invention.

The above-described apparatus and methods according to the present invention can be implemented in hardware or firmware, or as software or computer code, or combinations thereof. Various components such as a controller, a central processing unit (CPU), a processor, and any unit or device described herein includes at least hardware and/or other physical structures and elements. In addition, the software or computer code can also be stored in a non-transitory recording medium such as a CD ROM, a RAM, a ROM whether erasable or rewritable or not, a floppy disk, CDs, DVDs, memory chips, a hard disk, a magnetic storage media, an optical recording media, or a magneto-optical disk or computer code downloaded over a network originally stored on a remote recording medium, a computer readable recording medium, or a non-transitory machine readable medium and to be stored on a local recording medium, so that the methods described herein can be rendered in such software, computer code, software modules, software objects, instructions, applications, applets, apps, etc. that is stored on the recording medium using a general purpose computer, a digital computer, or a special processor or in programmable or dedicated hardware, such as an ASIC or FPGA. As would be understood in the art, the computer, the processor, microprocessor controller or the programmable hardware include volatile and/or non-volatile storage and memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, the program may be electronically transferred through any medium such as communication signals transmitted by wire/wireless connections, and their equivalents. The programs and computer readable recording medium can also be distributed in network-coupled computer systems so that the computer readable code is stored and executed in a distributed fashion.

The electronic device 100 may receive the program from a program provider wired/wirelessly connected thereto, and store the program. The program provider may include a memory for storing programs having instructions to perform the exemplary embodiments of the present invention, information necessary for the exemplary embodiments of the present invention, etc., a communication unit for wired/wirelessly communicating with the electronic device 100, and the controller 110 for sending the program to the transceiver at the request of the electronic device 100 or automatically.

Several exemplary embodiments have been illustrated and described, but it will be understood that various modifications can be made without departing the scope of the present invention. Thus, it will be apparent to those ordinary skilled in the art that the invention is not limited to the exemplary embodiments described, but can encompass not only the appended claims but the equivalents.

What is claimed is:

1. A method comprising:
displaying, on a touch screen of an electronic device, an index bar area and at least a portion of a plurality of first items included in a list including the plurality of first items of a first language and a plurality of second items of a second language different from the first language, wherein a plurality of first indices are displayed together with only one second representative index object in the index bar area, the plurality of first indices respectively corresponding to entire letters of the first language and sequentially arranged in a first predetermined order, the only one second representative index object being one of entire letters of the second language;
based on a first user input selecting the only one second representative index object in the index bar area, changing indices displayed in the index bar area by:
replacing the only one second representative index object and the plurality of first indices with a plurality of second indices corresponding to the entire letters of the second language and only one first representative index object corresponding to one of the entire letters of the first language, wherein each one of the plurality of second indices irrespectively corresponds to each one of the entire letters of the second language; and
wherein selection of the one of the plurality of second indices causes scrolling of the plurality of second items to items of the second plurality of items that begin with the one of the entire letters of the second language and maintaining display of the plurality of second indices and only one first representative index object.

2. The method of claim 1, wherein the first user input includes a touch input on an area in which the only one second representative index object is displayed or a drag input that ends in an area in which the only one second representative index object is displayed after starting in an area in which the plurality of first indices are displayed.

3. The method of claim 1, wherein the only one first representative index object is labeled with a first or last letter in the first language, and
wherein the only one second representative index object labeled with a first or last letter in the second language.

4. The method of claim 1, wherein selecting the only one first representative index object in the index bar area, causes:
replacing the only one first representative index object and the plurality of second indices with the plurality of first indices corresponding to the entire letters of the first language and the only one second representative index object, wherein each one of the plurality of first indices respectively corresponds to each one of the entire letters of the first language,
wherein selection of the one of the plurality of first indices causes scrolling of the plurality of first items to items of the first plurality of items that begin with the one of the entire letters of the first language and maintaining display of the plurality of first indices and the only one second representative index object.

5. An electronic device comprising:
a touch screen; and
at least one processor configured to:
display, on the touch screen, an index bar area and at least a portion of a plurality of first items included in a list including the plurality of first items of a first language and a plurality of second items of a second language different from the first language, wherein a plurality of first indices are displayed together with only one second representative index object in the index bar area, the plurality of first indices respectively corresponding to entire letters of the first language and sequentially arranged in a first predetermined order, the only one second representative index object being one of entire letters of the second language,
based on a first user input selecting the only one second representative index object in the index bar area, change indices displayed in the index bar area by:
replacing the only one second representative index object and the plurality of first indices with a plurality of second indices corresponding to the entire letters of the second language and only one first representative index object corresponding to one of the entire letters of the first language, wherein each one of the plurality of second indices respectively corresponds to each one of the entire letters of the second language; and
wherein selection of the one of the plurality of second indices causes scrolling of the plurality of second items to items of the second plurality of items that begin with the one of the entire letters of the second language and maintaining display of the plurality of second indices and only one first representative index object,
based on a second user input on an area in which at least a portion of the plurality of second items are displayed, scroll the list, and
based on the portion of the plurality of first items being displayed by scrolling the list, change the indices displayed in the index bar area by:
replacing the only one first representative index object and the plurality of second indices with the plurality of first indices corresponding to the entire letters of the first language and the only one second representative index object, wherein each one of the plurality of first indices respectively corresponds to each one of the entire letters of the first language,
wherein selection of the one of the plurality of first indices causes scrolling of the plurality of first items to items of the first plurality of items that begin with the one of the entire letters of the first language and maintaining display of the plurality of first indices and the only one second representative index object.

6. The electronic device of claim 5, wherein the first user input includes a touch input on an area in which the only one second representative index object is displayed or a drag input that ends in an area in which the only one second representative index object is displayed after starting in an area in which the plurality of first indices are displayed.

7. The electronic device of claim 5, wherein the first only one representative index object is labeled with a first letter or a last letter of the first language, and
wherein the only one second representative index object is labeled with a first letter or a last letter of the second language.

8. A non-transitory machine-readable storage device storing instructions that, when executed by at least one processor of an electronic device, cause the at least one processor to perform operations comprising:
displaying, on a touch screen of the electronic device, an index bar area and at least a portion of a plurality of first items included in a list including the plurality of first items of a first language and a plurality of second items of a second language different from the first language, wherein a plurality of first indices are displayed together with only one second representative index object in the index bar area, the plurality of first indices respectively corresponding to entire letters of the first language and sequentially arranged in a first predetermined order, the only one second representative index object being one of entire letters of the second language;
based on a first user input selecting the only one second representative index object in the index bar area, changing indices displayed in the index bar area by:
replacing the only one second representative index object and the plurality of first indices with a plurality of second indices corresponding to the entire letters of the second language and only one first representative index object corresponding to one of the entire letters of the first language, wherein each one of the plurality of second indices respectively corresponds to each one of the entire letters of the second language,
wherein selection of the one of the plurality of second indices causes scrolling of the plurality of second items to items of the second plurality of items that begin with the one of the entire letters of the second language and maintaining display of the plurality of second indices and only first representative index object,
based on a second user input on an area in which at least a portion of the plurality of second items are displayed, scrolling the list; and based on the portion of the plurality of first items being displayed by scrolling the list, changing the indices displayed in the index bar area by:
replacing the only one first representative index object and the plurality of second indices with the plurality of first indices corresponding to the entire letters of the first language and the only one second representative index object, wherein each one of the plurality of first indices respectively corresponds to each one of the entire letters of the first language,
wherein selection of the one of the plurality of first indices causes scrolling of the plurality of first items to items of the first plurality of items that begin with the one of the entire letters of the first language and maintaining display of the plurality of first indices and the only one second representative index object.

9. The non-transitory machine-readable storage device of claim 8, wherein the first user input includes a touch input on an area in which the only one second representative index object is displayed or a drag input that ends in an area in which the only one second representative index object is displayed after starting in an area in which the plurality of first indices are displayed.

10. The non-transitory machine-readable storage device of claim 8, wherein the only one first representative index object is labeled with a first letter or last letter of the first language, and
wherein the only one second representative index object is labeled with a first letter or last letter of the second language.

11. An electronic device comprising:
a touch screen; and
at least one processor configured to:
display, on the touch screen, an index bar area and at least a portion of a plurality of first items included in a list including the plurality of first items of a first language and a plurality of second items of a second language different from the first language, wherein a plurality of first indices are displayed vertically above only one second representative index object in the index bar area, the plurality of first indices respectively corresponding to sequential letters of the first language, the only one second representative index object being one of the letters of the second language,
based on a first user input selecting the only one second representative index object in the index bar area, change indices displayed in the index bar area by:
replacing the only one second representative index object and the plurality of first indices with a plurality of second indices corresponding to the sequential letters of the second language and only one first representative index object corresponding to one of the sequential letters of the first language, wherein each one of the plurality of second indices respectively corresponds to each one of the sequential letters of the second language, wherein the only one first representative index object is displayed vertically above the plurality of second indices in the index bar area,
wherein selection of the one of the plurality of second indices causes scrolling of the plurality of second items to items of the second plurality of items that begin with the one of the sequential letters of the second language and maintaining display of the plurality of second indices and the only first representative index object,
based on a second user input on an area in which at least a portion of the plurality of second items are displayed, scroll the list, and
based on the portion of the plurality of first items being displayed by scrolling the list, change the indices displayed in the index bar area by:
replacing the only one first representative index object and the plurality of second indices with the plurality of first indices corresponding to the sequential letters of the first language and the only one second representative index object, wherein each one of the plurality of first indices respectively corresponds to each one of the sequential letters of the first language,
wherein selection of the one of the plurality of first indices causes scrolling of the plurality of first items to items of the first plurality of items that begin with the one of the sequential letters of the first language and maintaining display of the plurality of first indices and the only one second representative index object.

* * * * *

UNITED STATES PATENT AND TRADEMARK OFFICE
CERTIFICATE OF CORRECTION

| | | |
|---|---|---|
| PATENT NO. | : 11,550,466 B2 | Page 1 of 1 |
| APPLICATION NO. | : 16/103109 | |
| DATED | : January 10, 2023 | |
| INVENTOR(S) | : Sung-Joon Won | |

It is certified that error appears in the above-identified patent and that said Letters Patent is hereby corrected as shown below:

In the Claims

Column 36, Claim 1, Line 61 should read as follows:
--...one of the plurality of second indices respectively...--

Signed and Sealed this
Twenty-first Day of February, 2023

*Katherine Kelly Vidal*

Katherine Kelly Vidal
*Director of the United States Patent and Trademark Office*